United States Patent
Chen et al.

(10) Patent No.: US 7,734,257 B2
(45) Date of Patent: Jun. 8, 2010

(54) DYNAMIC SHARED FORWARD LINK CHANNEL FOR A WIRELESS COMMUNICATION SYSTEM

(75) Inventors: Tao Chen, La Jolla, CA (US); Baaziz Achour, San Diego, CA (US); Brian K. Butler, La Jolla, CA (US); Edward G. Tiedemann, Jr., San Diego, CA (US); Haitao Zhang, La Jolla, CA (US); Keith W. Saints, San Diego, CA (US); Luca Blessent, San Marcos, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1342 days.

(21) Appl. No.: 10/889,926

(22) Filed: Jul. 12, 2004

(65) Prior Publication Data

US 2005/0208959 A1 Sep. 22, 2005

Related U.S. Application Data

(60) Provisional application No. 60/486,838, filed on Jul. 11, 2003, provisional application No. 60/496,305, filed on Aug. 18, 2003.

(51) Int. Cl.
*H04B 1/00* (2006.01)

(52) U.S. Cl. .......... 455/69; 455/450; 455/464; 455/509; 455/522; 370/318; 370/328; 370/342

(58) Field of Classification Search ........... 370/230, 370/252, 318, 320, 329, 335, 340, 342, 345, 370/390, 465, 432, 479, 441, 130, 336, 331, 370/328, 330, 338; 445/442, 454, 455, 464, 445/515, 522, 574, 69, 101, 450, 562, 509, 445/460; 450/69, 101, 450, 562; 375/130
See application file for complete search history.

(56) References Cited

U.S. PATENT DOCUMENTS 5,383,219 A 1/1995 Wheatley, III et al.

(Continued)

FOREIGN PATENT DOCUMENTS

EP 1133208 A 9/2001

(Continued)

OTHER PUBLICATIONS

Physical Layer Standard for CDMA 2000 Spread Spectrum Systems, Release C, Version 1.0, Dated May 28, 2002.*

(Continued)

*Primary Examiner*—Dwayne Bost
*Assistant Examiner*—Inder P Mehra
(74) *Attorney, Agent, or Firm*—Jeffrey D. Jacobs

(57) ABSTRACT

A dynamic shared forward link channel (or "data" channel) is used to send multicast data to a group of wireless devices, e.g., using a common long code mask for the data channel. Reference power control (PC) bits are also sent on the data channel and used for signal quality estimation. A shared forward link control channel is used to send user-specific signaling to individual wireless devices, e.g., using time division multiplexing (TDM) and a unique long code mask for each wireless device. A shared forward link indicator channel is used to send reverse link (RL) PC bits to the wireless devices, e.g., using TDM. The data channel is jointly power controlled by all wireless devices receiving the data channel. The control and indicator channels are individually power controlled by each wireless device such that the signaling and RL PC bits sent on these channels for the wireless device are reliably received.

65 Claims, 11 Drawing Sheets

U.S. PATENT DOCUMENTS

| | | | |
|---|---|---|---|
| 5,461,539 | A | 10/1995 | Wheatley, III et al. |
| 5,764,632 | A * | 6/1998 | Ylitervo .................... 370/337 |
| 5,893,035 | A | 4/1999 | Chen |
| 5,960,361 | A | 9/1999 | Chen |
| 6,249,683 | B1 | 6/2001 | Lundby et al. |
| 6,396,867 | B1 | 5/2002 | Tiedemann, Jr. et al. |
| 6,490,460 | B1 | 12/2002 | Soliman |
| 6,526,031 | B1 * | 2/2003 | Zaff et al. .................. 370/335 |
| 7,006,482 | B1 * | 2/2006 | Choi et al. .................. 370/342 |
| 2001/0011024 | A1 | 8/2001 | Lundby et al. |
| 2001/0046877 | A1 | 11/2001 | Ohkubo et al. |
| 2002/0057659 | A1 | 5/2002 | Ozluturk et al. |
| 2002/0085502 | A1 | 7/2002 | Chheda et al. |
| 2002/0101832 | A1 * | 8/2002 | Chen et al. ................. 370/318 |
| 2002/0122397 | A1 | 9/2002 | Ling et al. |
| 2002/0126739 | A1 | 9/2002 | Tiedemann, Jr. et al. |
| 2002/0131376 | A1 | 9/2002 | Wheatley, III et al. |
| 2002/0137535 | A1 * | 9/2002 | Hunzinger .................. 455/522 |
| 2002/0141357 | A1 * | 10/2002 | Park et al. .................. 370/328 |
| 2002/0142772 | A1 * | 10/2002 | Hunzinger .................. 455/436 |
| 2002/0181423 | A1 | 12/2002 | Chen et al. |
| 2003/0013476 | A1 | 1/2003 | Park et al. |
| 2003/0036403 | A1 | 2/2003 | Shiu et al. |
| 2003/0040315 | A1 * | 2/2003 | Khaleghi et al. ............ 455/435 |
| 2003/0050084 | A1 * | 3/2003 | Damnjanovic et al. ...... 455/522 |
| 2003/0083092 | A1 | 5/2003 | Kim et al. |
| 2003/0083093 | A1 * | 5/2003 | Yun et al. ................... 455/522 |
| 2003/0123413 | A1 * | 7/2003 | Moon et al. ................. 370/335 |
| 2003/0157952 | A1 | 8/2003 | Sarkkinen et al. |
| 2004/0013102 | A1 * | 1/2004 | Fong et al. .................. 370/345 |
| 2004/0013103 | A1 * | 1/2004 | Zhang et al. ................ 370/345 |
| 2004/0042438 | A1 * | 3/2004 | Jiang et al. .................. 370/342 |
| 2004/0087331 | A1 * | 5/2004 | Hwang et al. ............... 455/522 |

FOREIGN PATENT DOCUMENTS

| | | |
|---|---|---|
| EP | 11332008 | 9/2001 |
| JP | 54-048411 | 4/1979 |
| JP | 07-23013 | 1/1995 |
| RU | 20054804 | 2/1996 |
| SU | 1506568 | 9/1989 |
| WO | 9631014 | 10/1996 |
| WO | 0245358 | 6/2002 |
| WO | 0245358 A | 6/2002 |
| WO | 02080401 | 10/2002 |

OTHER PUBLICATIONS

Carl-Gustav, "Distributed Power Control in Cellular radio Systems with Down-Link Multi-cast Traffic," Radio Communications System Lab, Dept. of Signals Sensors and Systems.

Wang, K., et al., "A Distributed Joint Scheduling and Power Control Algorithm for Multicasting in Wireless Ad Hoc Networks," ECE Department. Univ. of California.

3GPP: "Physical Layer Standard for cdma2000 Spread Spectrum Systems—Release C" $3^{rd}$ Generation Partnership Project 2—3GPP2, May 28, 2002, pp. 1-45, XP002311844.

R. Thomas Derreberry, Alan Hsu, Walt Tamminen: "Overview of cdma2000 revision D", Dec. 21, 2004, XP002311845.

3GGP2 C.S0002-D. "Physical Layer Standard for CDMA Spread Spectrum Systems Revision D. "Version 1.0, Feb. 13, 2004.

International Preliminary Report on Patentability-PCT/US04/022529. IPEA/US-Aug. 3, 2005.

International Search Report-PCT/US04/022529, International Search Authority-European Patent Office-Jan. 4, 2005.

R. Thomas Derryberry, Alan Hsu. Walt Tamminen: "Overview of CDMA2000 Revision D", Dec. 21, 2004.

Written Opinion-PCT/US04/022529. International Search Authority-European Patent Office-Jan. 4, 2005.

* cited by examiner

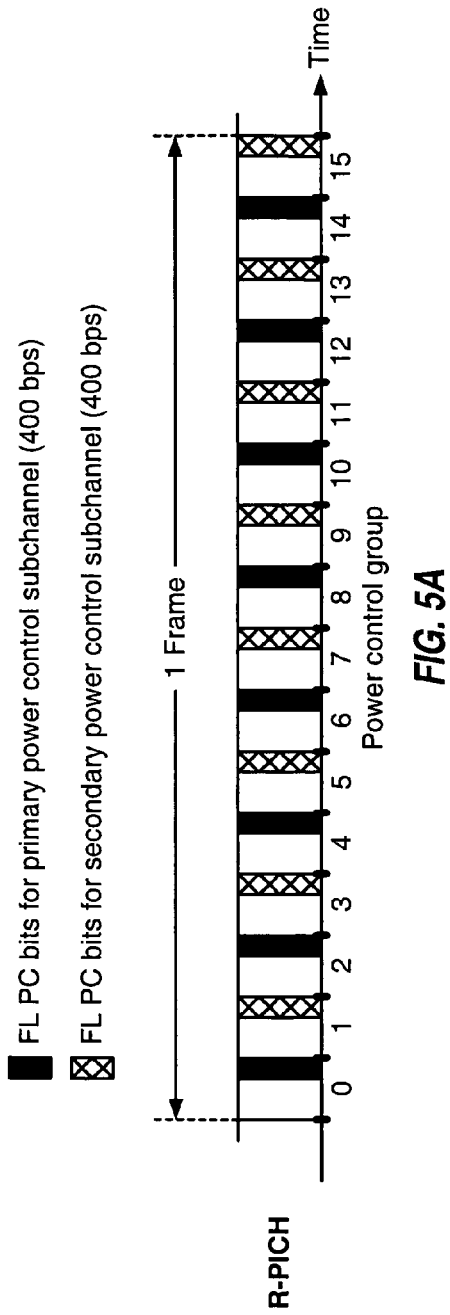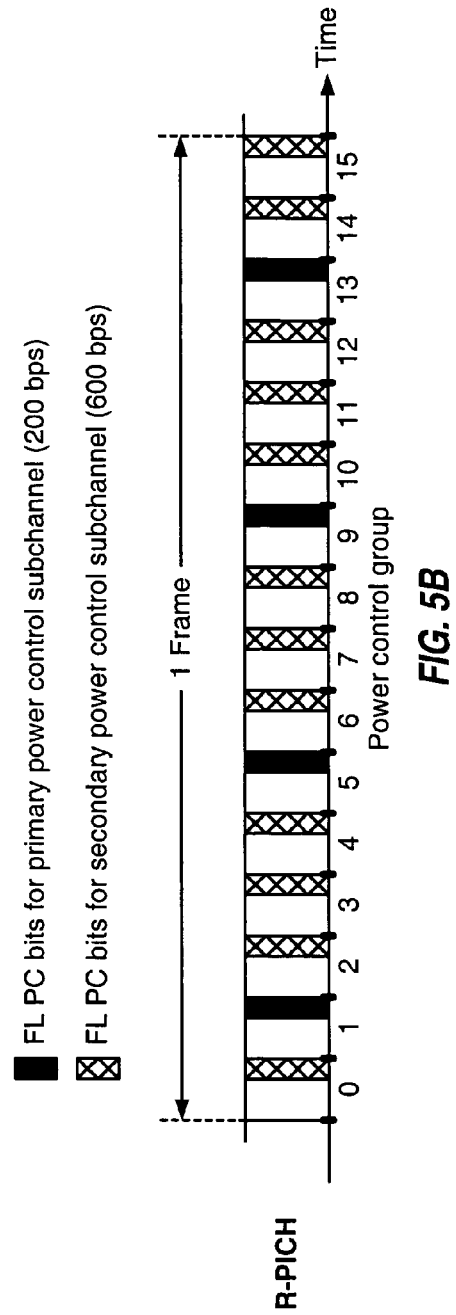

DYNAMIC SHARED FORWARD LINK CHANNEL FOR A WIRELESS COMMUNICATION SYSTEM

CLAIM OF PRIORITY UNDER 35 U.S.C. §119

The present application for patent claims priority to Provisional Application Ser. No. 60/486,838, entitled "Method and Apparatus for a Dynamic Shared Forward Link Channel in a Wireless Communication System," filed Jul. 11, 2003, and Provisional Application Ser. No. 60/496,305, entitled "Method and Apparatus for a Dynamic Shared Forward Link Channel in a Wireless Communication System," filed Aug. 18, 2003, both assigned to the assignee hereof and hereby expressly incorporated by reference herein.

BACKGROUND

I. Field

The present invention relates generally to communication systems, and more specifically to a dynamic shared forward link channel for a wireless communication system.

II. Background

A wireless communication system may provide unicast, multicast, and/or broadcast services. A unicast service provides point-to-point communication between at least one base station and a specific wireless device. A multicast service provides point-to-multipoint communication between at least one base station and a group of wireless devices. A broadcast service provides point-to-multipoint communication between at least one base station and all wireless devices within a designated coverage area.

Unicast, multicast, and broadcast services are used for different applications and have different requirements. Unicast services are commonly used for voice and packet data calls and typically require dedicated system resources (e.g., traffic channels) for both the forward link and reverse link in order to facilitate two-way communication. The forward link (or downlink) refers to the communication link from base stations to wireless devices, and the reverse link (or uplink) refers to the communication link from the wireless devices to the base stations. Broadcast services are often used to send broadcast-data to all wireless devices in a designated coverage area. Broadcast data may be efficiently sent on a single broadcast channel, and control information for the broadcast channel may be sent on an associated control channel. Since broadcast services typically provide one-way communication, little or no system resources may be required for the reverse link.

Multicast services may be used to send multicast data from at least one base station to a specific group of wireless devices. Multicast data is traffic data of interest to multiple wireless devices and may be for content such as voice, news, weather, movies, sporting events, and so on. A multicast service may support two-way communication between the at least one base station and the wireless devices, although the bulk of the transmission may be on the forward link. A multicast service may be implemented by sending the same multicast data to individual wireless devices via separate forward link channels. However, the redundant transmission of the multicast data on multiple forward link channels by the same base station consumes system resources and limits the number of wireless devices that may be supported by the multicast service.

There is therefore a need in the art for techniques to more efficiently provide multicast service in a wireless communication system.

SUMMARY

Techniques for efficiently providing multicast service using a dynamic shared forward link (FL) channel are described herein. As used herein, a "shared" channel is one that may be received by multiple wireless devices, and a "dedicated" channel is one that is used for a specific wireless device.

The dynamic shared forward link channel, which is a shared forward link data channel (or simply, a "data" channel), is used to send multicast data to a group of wireless devices. The multicast data may be sent, e.g., using a scrambling/long code generated based on a common long code mask for the data channel. To facilitate power control of the data channel, reference power control (PC) bits of a known value may be sent on the data channel and used for signal quality estimation by the wireless devices. A shared forward link control channel (or simply, a "control" channel) may be used to send user-specific signaling (e.g., for basic call operation and other purposes) to individual wireless devices. User-specific signaling for all wireless devices may be sent, e.g., using time division multiplexing (TDM). The signaling for each wireless device may be sent, e.g., using a scrambling/long code generated based on a unique long code mask for the wireless device. A shared forward link indicator channel (or simply, an "indicator" channel) may be used to send reverse link (RL) PC bits to the wireless devices (e.g., using TDM). RL PC bits are sent to each wireless device and are used to adjust the transmit power of the wireless device for the reverse link.

Each wireless device receiving the multicast service may maintain a reverse link connection with one or more base stations in order to facilitate "dynamic" coverage for the multicast service, support power control, and reduce communication delay. The dynamic coverage means that the wireless device can receive the multicast service even if the device moves about the system. Each wireless device may transmit a pilot and FL PC bits on a reverse link pilot channel. The FL PC bits are sent to the one or more base stations and are used to adjust the transmit power of the forward link channels. Each wireless device may also transmit data and/or signaling on a reverse link data channel and/or a reverse link control channel as needed.

The shared forward link data channel may be jointly power controlled by the wireless devices to achieve good performance for all wireless devices while reducing transmit power and interference. Each wireless device may estimate the received signal quality for the data channel based on the reference PC bits sent on the data channel, generate FL PC bits for the data channel based on the received signal quality estimate, and send these FL PC bits on a primary reverse power control subchannel to one or more base stations. Each base station adjusts the transmit power for the data channel based on the FL PC bits received from all wireless devices for the data channel.

The control and indicator channels may be power controlled by individual wireless devices to achieve good performance for each wireless device. Each wireless device may estimate the received signal quality for the control channel based on the RL PC bits sent to the wireless device on the indicator channel, generate FL PC bits for the control and indicator channels based on the received signal quality estimate, and send these FL PC bits on a secondary reverse power control subchannel to one or more base stations. Each base station adjusts the transmit powers of the control and indicator channels for each wireless device based on the FL PC bits received from that wireless device for these channels.

Techniques for performing soft and hard handoffs to facilitate dynamic coverage are described below. Other embodiments for providing multicast service as well as various aspects and embodiments of the invention are also described below.

BRIEF DESCRIPTION OF THE DRAWINGS

FIGS. 5A and 5B show two reverse power control subchannels of an R-PICH;

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
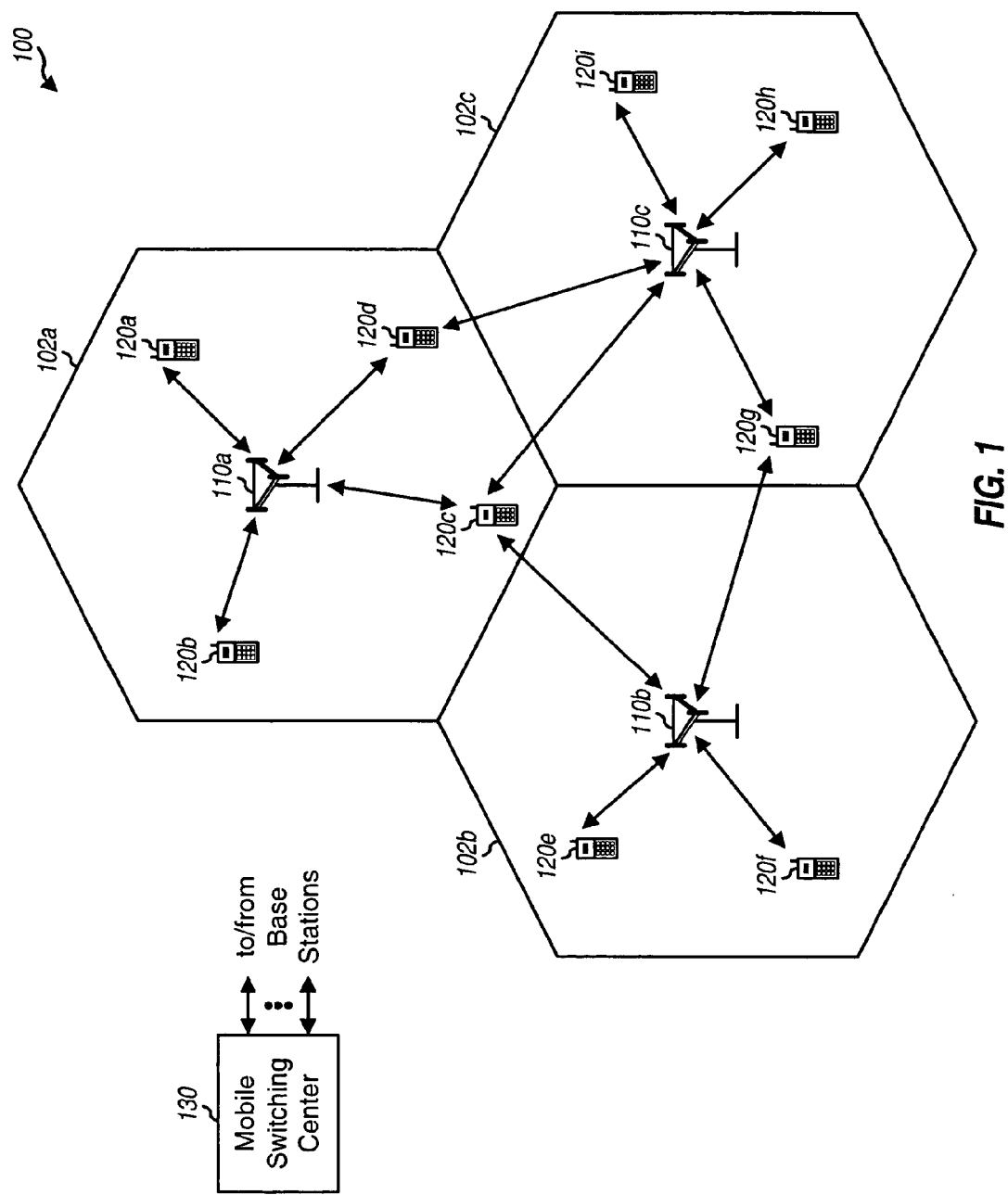
FIG. 1 shows a wireless communication system.

FIG. 1 shows a wireless communication system 100 with a number of base stations 110 that provide communication services for a number of wireless devices 120. A base station is generally a fixed station and may also be referred to as a base transceiver station (BTS), a Node B, an access point, or some other terminology. A wireless device may be fixed or mobile and may also be referred to as a mobile station (MS), a mobile equipment (ME), a user equipment (UE), a user terminal, a subscriber unit, or some other terminology. The wireless devices may be dispersed throughout the system. A mobile switching center (MSC) 130 provides coordination and control for the base stations. An MSC may also be referred to as a radio network controller (RNC) or some other terminology.

System 100 may be a Code Division Multiple Access (CDMA) system that may implement one or more CDMA standards such as IS-2000, IS-856, IS-95, Wideband CDMA (W-CDMA), and so on. System 100 may also be a Time Division Multiple Access (TDMA) system that may implement one or more TDMA standards such as Global System for Mobile Communications (GSM). These standards are well known in the art. The techniques described herein for providing multicast service using a dynamic shared forward link channel may be used for various wireless communication systems. For clarity, these techniques are specifically described for an IS-2000 system.

System 100 supports multicast service and is capable of transmitting multicast data to a group of wireless devices in an efficient manner. Various schemes for providing multicast service are described below. Each multicast scheme has one or more of the following characteristics:

A shared forward link channel is used to send multicast data to a group of wireless devices and may be jointly power controlled by these wireless devices;

A shared or dedicated forward link channel is used to send user-specific signaling to individual wireless devices;

Dynamic coverage of multicast service is provided for each wireless device;

Each wireless device maintains a reverse link connection to facilitate dynamic coverage, support power control, and reduce communication delay; and Power control is performed for the forward and reverse link channels to achieve good performance while reducing transmit power and interference.

Table 1 lists five exemplary schemes for providing multicast service. For these schemes, multicast data may be sent on a Forward Fundamental Channel (F-FCH) or a Forward Supplemental Channel (F-SCH). The F-FCH and F-SCH are different embodiments of the dynamic shared forward link channel. The F-FCH may also be called a Forward Multicast Fundamental Channel (F-MFCH) or some other terminology. User-specific signaling for the wireless devices may be sent on the F-FCH, a Forward Dedicated Control Channel (F-DCCH), a Forward Packet Data Channel (F-PDCH), or a Forward Common Control Channel (F-CCCH). RL PC information to adjust the transmit power of the wireless devices may be sent on a Forward Common Power Control Channel (F-CPCCH), which is carried by a Forward Indicator Control Channel (F-ICCH). User-specific signaling and RL PC information for each wireless device may also be sent on a dedicated F-DCCH assigned to that wireless device. For simplicity, the forward link channels are shared channels in the following description, unless otherwise noted. The forward link and reverse link channels for IS-2000 are described in a document 3GPP2 C.S0002-D, entitled "Physical Layer Standard for cdma2000 Spread Spectrum Systems Revision D," Version 1.0, dated Feb. 13, 2004, which is publicly available and hereinafter referred to as the "C.S0002D" document. The five multicast schemes in Table 1 are described in further detail below.

TABLE 1

| Multicast Scheme | Common Multicast Data | User-Specific Signaling | User-Specific PC Information |
|---|---|---|---|
| 1 | F-FCH | F-DCCH | F-CPCCH |
| 2 | F-FCH | F-FCH | F-CPCCH |
| 3 | F-FCH | dedicated F-DCCH | dedicated F-DCCH |
| 4 | F-SCH | F-CCCH | none |
| 5 | F-FCH | F-PDCH | F-CPCCH |

1. Multicast Scheme 1: F-FCH, F-DCCH, and F-CPCCH

Figure 2:
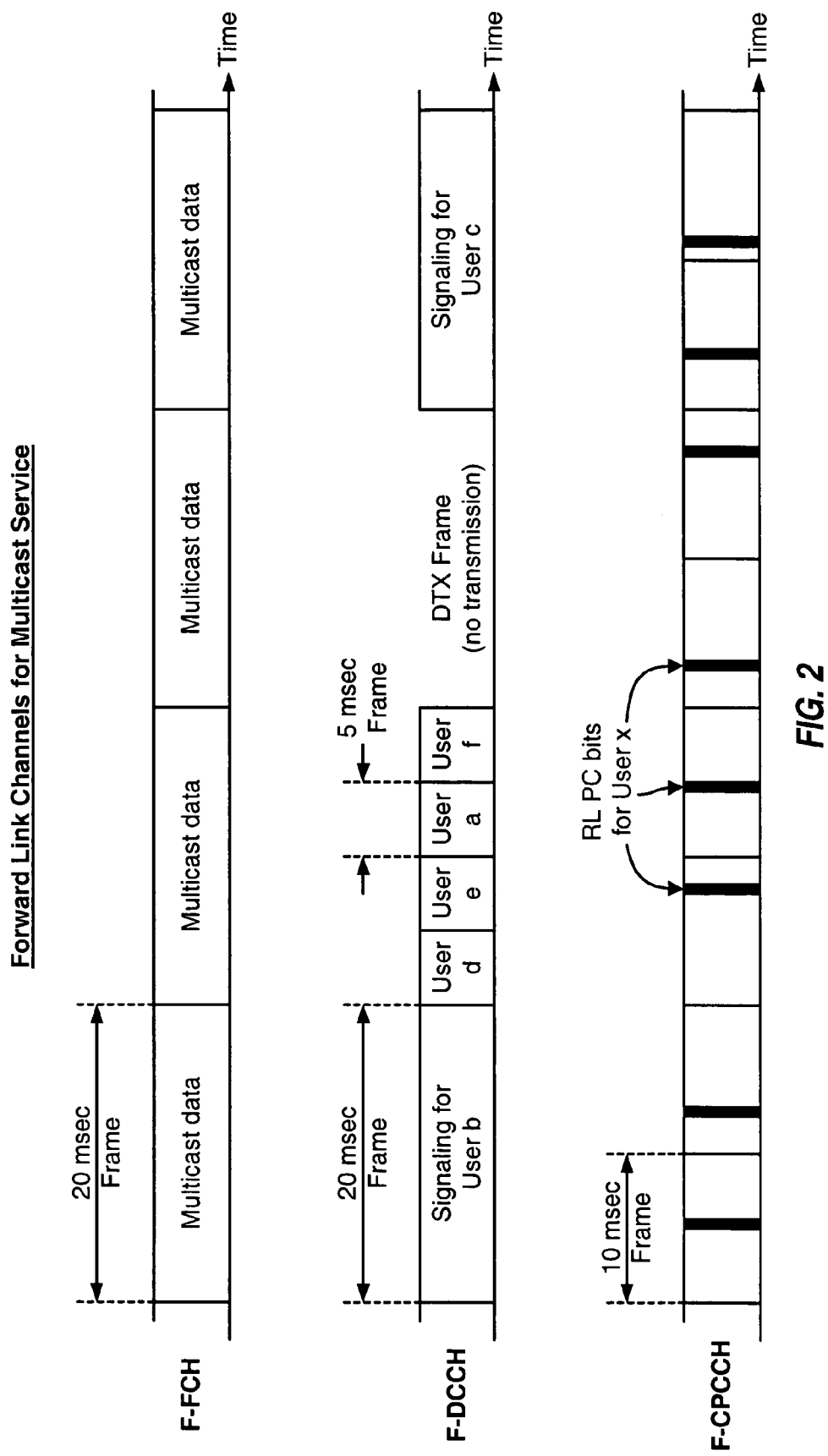
FIG. 2 shows a set of forward link channels used to provide multicast service.

FIG. 2 shows the forward link channels used to provide multicast service in multicast scheme 1. The forward link channels include an F-FCH, at least one F-DCCH, and at least one F-CPCCH. The F-FCH is used to send multicast data to the wireless devices. The F-DCCH(s) are used to send user-specific signaling to the wireless devices in a TDM manner. The F-DCCH(s) may carry (1) signaling related to registration with the system, basic call operation, and so on, (2) pages for the wireless devices, and (3) messages to handoff, continue, or end a call. The F-CPCCH(s) are used to send RL PC information to the wireless devices.

The forward and reverse link channels carry data in frames. A frame is a predetermined time interval for a given forward/reverse link channel. Each forward/reverse link channel may utilize one or multiple frame sizes. Different forward/reverse link channels may utilize the same or different frame sizes.

The F-FCH may carry multicast data using one or more frame sizes (e.g., 20 msec and/or 5 msec). The frame size(s) for the F-FCH may be configured at the start of a call and may dynamically change from frame to frame. The F-FCH may carry multicast data at "variable" data rates such as, e.g., 9600, 4800, 2700, 1500, and so on, bits per second (bps). The F-FCH is also associated with a common long code mask (LCM) used to generate a long code for scrambling the multicast data. The wireless devices are aware of the common long code mask for the F-FCH and can perform the complementary descrambling to recover the multicast data.

Although not shown in FIG. 2 and not listed in Table 1 for clarity, one or multiple F-SCHs may also be used to carry multicast data and may be shared in the same manner as the F-FCH. Each F-SCH may be transmitted in the manner described in IS-2000.

Each F-DCCH may carry signaling using one or more frame sizes (e.g., 20 msec and/or 5 msec) that may dynamically change from frame to frame, as shown in FIG. 2. Each F-DCCH may also support discontinuous transmission (DTX), which means that no data may be sent on the F-DCCH in a given frame. The decision to transmit or not transmit on the F-DCCH may be made on a frame-by-frame basis, for example, based on whether there is any signaling to send.

One or multiple F-DCCHs may be used for the multicast service depending on the number of wireless devices receiving the multicast service and/or other factors. One F-DCCH may be used if a small group of wireless devices is receiving the multicast service. Additional F-DCCHs may be added if and as more wireless devices join the multicast service. Conversely, F-DCCHs may be taken down if not needed any more to support the multicast service. Each F-DCCH may carry signaling for all or a subset of the wireless devices. Each wireless device may be assigned to one F-DCCH. In this case, signaling for each wireless device may be sent on the assigned F-DCCH whenever the signaling becomes available and based on the availability of the F-DCCH. A wireless device may also be assigned to multiple F-DCCHs on which the device can receive signaling. In this case, signaling for the wireless device may be sent on any one of the assigned F-DCCHs, which can reduce delay to send the signaling to the wireless device. Each wireless device is associated with a unique long code mask. The signaling for each wireless device may be scrambled with a long code generated using the device's unique long code mask and may be descrambled by that wireless device.

Various radio configurations may be used for the F-FCH and F-DCCH. Each radio configuration is associated with specific physical layer parameters such as data rates, modulation characteristics, and spreading rate. The parameters for each radio configuration are described in the aforementioned C.S0002-D document.

One or multiple F-CPCCH may be used for the multicast service depending on the number of wireless devices receiving the multicast service. A single F-CPCCH may be used initially, and additional F-CPCCHs may be added as more wireless devices join the multicast service. Multiple wireless devices may be assigned to each F-CPCCH.

Each F-CPCCH carries one forward power control subchannel for each wireless device assigned to that F-CPCCH. Each forward power control subchannel carries RL PC bits for the assigned wireless device at one of multiple possible rates (e.g., 800, 400, and 200 bps). Each F-CPCCH carries RL PC bits for its assigned wireless devices using a fixed frame size (e.g., 10 msec). For each frame, each F-CPCCH carries the RL PC bits for all assigned wireless devices in a TDM manner and at pseudo-random positions determined based on the common long code mask, as described below. For simplicity, the following description assumes that one F-DCCH and one F-CPCCH are used for the multicast service.

Each forward link channel is associated with a different Walsh function or quasi-orthogonal function (QOF) that is used to "cover" the data sent on that forward link channel. Covering is a process whereby a given modulation symbol (or a set of L modulation symbols with the same value) is multiplied by all L chips of a period of L-chip long Walsh function to obtain L covered symbols, which are transmitted. Decovering is a complementary process whereby received symbols are multiplied by the L chips of the same L-chip Walsh function to obtain L decovered symbols, which are accumulated to obtain an estimate of the transmitted modulation symbol. The covering achieves orthogonality among multiple forward link channels sent simultaneously. This covering is sometimes referred to as "channelizing."

Each wireless device is informed of various parameters for the F-FCH as well as the F-DCCH and F-CPCCH to which the device has been assigned. For example, each wireless device may be informed of the Walsh functions for the F-FCH, F-DCCH, and F-CPCCH, the data rates for the forward link channels, the common long code mask for the F-FCH and F-CPCCH, the unique long code mask for the wireless device, the forward power control subchannel assigned to the wireless device for the F-CPCCH, and so on. The unique long code mask for each wireless device may be computed in a deterministic manner (e.g., based on a unique serial number of the wireless device) or may be assigned by a base station.

The transmit powers for the F-FCH, F-DCCH, and F-CPCCH may be adjusted to achieve good performance for all wireless devices receiving the multicast service.

Since the F-FCH is sent to all wireless devices, the transmit power for the F-FCH may be adjusted such that even the wireless device with the worst channel condition (e.g., the largest sum of path loss and required energy-per-bit-to-total-noise-and-interference ratio (Eb/Nt)) can reliably receive the F-FCH. The transmit power for the F-FCH may thus be jointly adjusted by all wireless devices. Signaling and RL PC bits are sent to individual wireless devices on the F-DCCH and F-CPCCH, respectively. The transmit powers for the F-DCCH and F-CPCCH may be adjusted for each wireless device such that the signaling and RL PC bits can be reliably received by the wireless device.

Reference PC bits (or simply, reference bits) may be sent on the F-FCH to facilitate power control of the F-FCH. The wireless devices may estimate the received signal quality of the F-FCH based on the reference PC bits and other FL conditions and then generate FL PC bits for the F-FCH accordingly.

Figure 3:
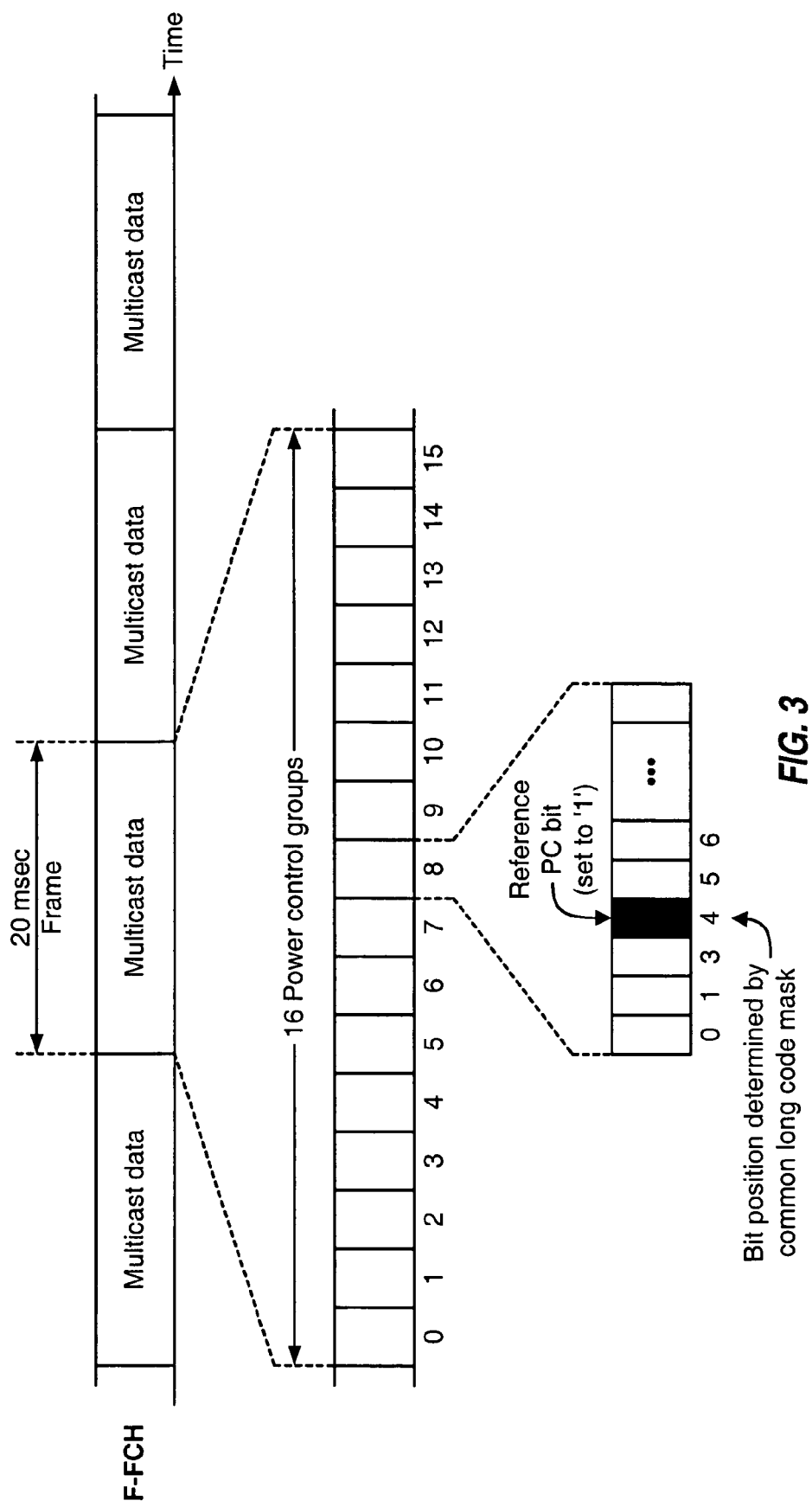
FIG. 3 shows transmission of the reference PC bits on an F-FCH.

FIG. 3 shows transmission of the reference PC bits on the F-FCH. The F-FCH may be configured to carry a forward power control subchannel. If the F-FCH is used as a dedicated channel to send data to a specific wireless device for a unicast service, then the forward power control subchannel carries RL PC bits used to adjust the transmit power of this wireless device. However, if the F-FCH is used as a shared channel for a multicast service, then the single forward power control subchannel on the F-FCH typically cannot carry the RL PC bits for all wireless devices receiving the multicast service. To do so would require (1) reduced RL PC feedback rates, which reduces the effectiveness of RL PC, (2) additional puncturing of the F-FCH and thus lowered forward error correction (FEC) coding gain for the F-FCH in order to accommodate the additional RL PC bits, or (3) both of the above. The RL PC bits for these wireless devices may be sent on the F-CPCCH instead. The PC bits for the forward power control subchannel of the F-FCH may be set to a known value (e.g., all '1s') and used as reference PC bits.

As shown in FIG. 3, each 20 msec frame on the F-FCH may be partitioned into 16 power control groups that are given indices of 0 through 15. Each power control group has a duration of 1.25 msec and carries one reference PC bit. The reference PC bit for each power control group is punctured in and replaces a certain number of modulation symbols that would have been sent on the F-FCH in that power control group. The location of the reference PC bit for each power control group is pseudo-random and determined by the common long code mask for the F-FCH. The reference PC bits are transmitted at a power level that a fixed offset from the transmit power level for the multicast data sent on the F-FCH. The reference PC bits may thus be used for forward link power control of the F-FCH, as described below.

Figure 4:
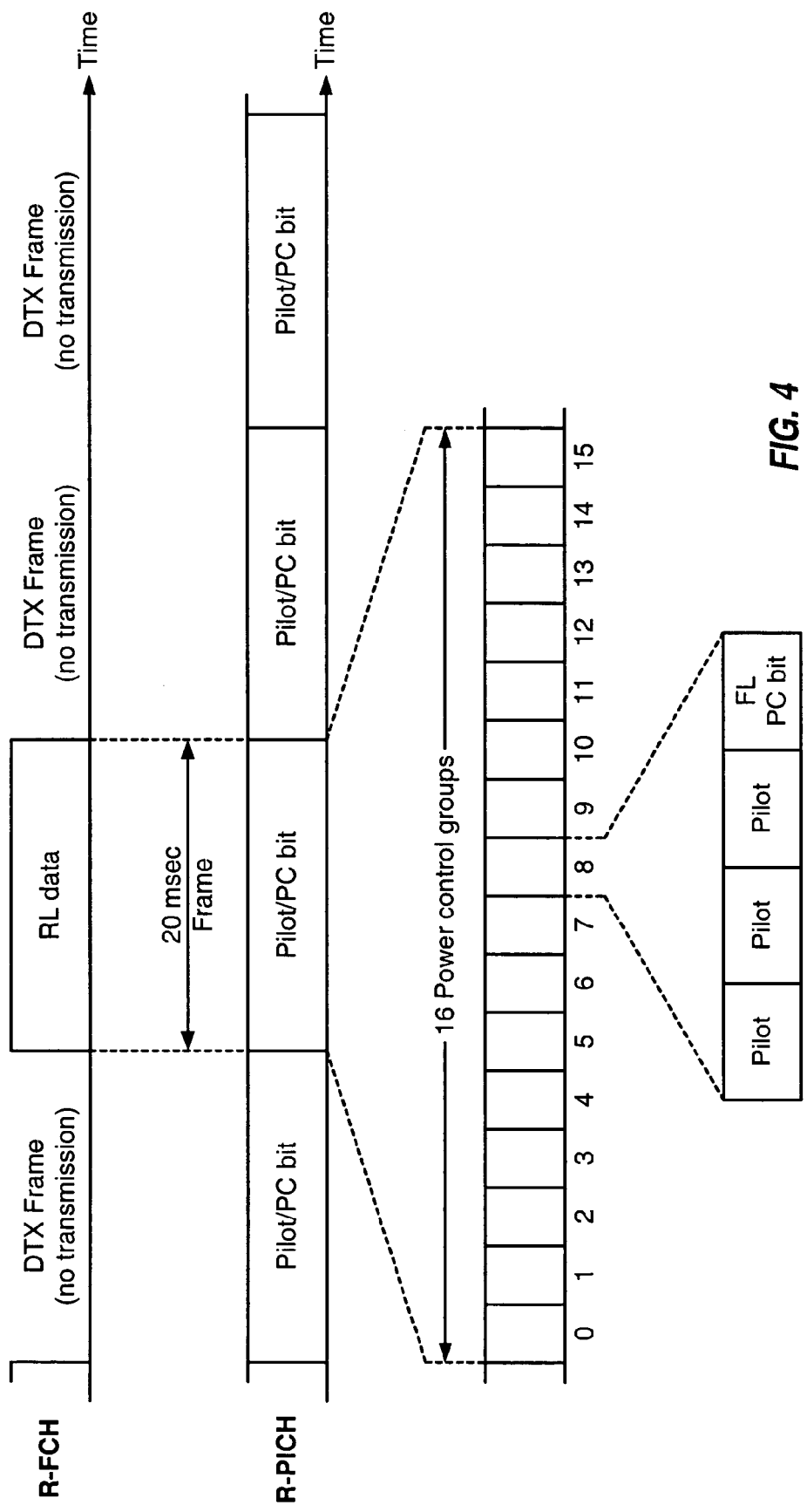
FIG. 4 shows a set of reverse link channels used for each wireless device.

FIG. 4 shows the reverse link channels for each wireless device receiving the multicast service. The reverse link channels include a Reverse Fundamental Channel (R-FCH) and a Reverse Pilot Channel (R-PICH). An R-DCCH may also be used in place of, or in addition to, the R-FCH. The wireless device uses the R-FCH and/or R-DCCH to send data and signaling to the system. The transmission characteristics may differ for the R-FCH and R-DCCH. For example, the R-FCH may be transmitted in each frame but at a variable rate, whereas the R-DCCH may or may not be transmitted in any given frame but may be sent at a fixed (e.g., full) rate if transmitted. For simplicity, the following description is the R-FCH, although much of the description may also apply to the R-DCCH. The wireless device uses the R-PICH to send a pilot on the reverse link and to send FL PC bits used to adjust the transmit powers of the forward link channels.

The R-FCH may carry data using one or more frame sizes (e.g., 20 msec and/or 5 msec). The R-FCH may carry data at variable data rates. The R-FCH may support gated transmission whereby data is sent 50% of the time in each frame on eight of the 16 power control groups. The R-FCH may also support discontinuous transmission so that the R-FCH is only active whenever there is data to send and inactive otherwise.

For multicast service, the R-PICH also carries a reverse power control subchannel that is multiplexed with the reverse link pilot. Each 20-msec segment on the R-PICH is partitioned into 16 power control groups, and each power control group is further partitioned into four quarters. The reverse link pilot is sent in the first thee quarters of each power control group. An FL PC bit is sent in the fourth quarter of each power control group. The R-PICH may also be gated in similar manner as the R-FCH. The R-FCH and R-PICH may both be gated off at the same time, which allows the wireless device to turn off its power amplifier in order to conserve battery power when not transmitting.

By maintaining an active reverse link connection for each wireless device receiving the multicast service, the location of the wireless device may be ascertained and the coverage for the multicast service may be dynamically tailored for the wireless device. A given base station may start and end the multicast service based on the reported locations of the wireless devices receiving the multicast service, as well as wireless devices requesting such service. The reverse link connection also provides power control feedback used to adjust the transmit powers of the F-FCH, F-DCCH, F-SCH (if transmitted), and F-CPCCH.

The reverse link connection for a given wireless device receiving the multicast service may be taken down (or terminated) for various reasons. For example, if the wireless device has not sent signaling on the R-FCH or FL PC bits on the R-PICH for a predetermined amount of time, then its reverse link connection may be taken down. As another example, if the number of wireless devices receiving the multicast service exceeds a predetermined number, then power control may be disabled for the F-FCH and the reverse link connection for each wireless device may be taken down to conserve reverse link resources and battery power at the wireless devices. The reverse link connection for a wireless device may be taken down in one or multiple stages. For example, the wireless device may transition from a normal operating mode to a gated mode after a first time period, and then to an idle mode after a second time period. The first and/or second time periods may be pre-defined or may be determined by the system and sent to the wireless devices. In the gated mode, the wireless device may send FL PC bits at a reduced rate (e.g., 400 or 200 bps) and may also receive RL PC bits at a reduced rate. In the idle mode, the wireless device may disable transmission on the R-PICH and R-FCH and may use a Reverse Access Channel (R-ACH) or a Reverse Enhanced Access Channel (R-EACH) to send signaling on the reverse link.

A. Forward Link Power Control

Forward link power control may be performed in various manners for multicast service. In an embodiment, the transmit power for the F-FCH is jointly adjusted by all wireless devices receiving the multicast service. Joint power control of the F-FCH can ensure that all wireless devices can reliably receive the F-FCH. In an embodiment, the transmit powers for the F-DCCH and F-CPCCH for each wireless device are adjusted by that wireless device. Individual power control of the F-DCCH and F-CPCCH can ensure that each wireless device can reliably receive its signaling and RL PC bits while consuming as little transmit power as possible. The F-DCCH and F-CPCCH may also be jointly power controlled, similar to the F-FCH. However, these channels are used in a time-division multiplexing fashion to individually address specific wireless devices at any given time, so there is no need to provide more power than is necessary for the specific wireless devices being targeted at the moment. Furthermore, joint power control of the F-DCCH and F-CPCCH by the set of wireless devices receiving multicast services would likely result in the transmit powers for these forward link channels being set to high levels by one or few wireless devices with poor channel conditions.

FIG. 5A shows the partitioning of the reverse power control subchannel on the R-PICH into a 400 bps primary reverse power control subchannel (which is also called substream 1) and a 400 bps secondary reverse power control subchannel (which is also called substream 2). It should be noted that FIGS. 5A and 5B only illustrate the grouping of the PC bits into these two subchannels rather than showing the actual duration of the bits. The reverse power control subchannel on the R-PICH has a rate of 800 bps. For $FPC\_MODE_S$='001' in IS-2000, the primary reverse power control subchannel carries FL PC bits in eight power control groups with even indices, and the secondary reverse power control subchannel carries FL PC bits in eight power control groups with odd indices.

FIG. 5B shows the partitioning of the reverse power control subchannel into a 200 bps primary reverse power control subchannel and a 600 bps secondary reverse power control subchannel for $FPC\_MODE_S$='010' in IS-2000. The primary reverse power control subchannel carries PC bits in four power control groups, and the secondary reverse power control subchannel carries FL PC bits in twelve power control groups.

The secondary reverse power control subchannel may carry FL PC bits for the F-FCH and may be sent at, e.g., 600 or 400 bps. The primary reverse power control subchannel may carry FL PC bits for both the F-DCCH and F-CPCCH and may be sent at, e.g., 600 or 400 bps. Alternatively, the primary reverse power control subchannel may carry the FL PC bits for the F-FCH and the reverse power control subchannel may carry the FL PC bits for the F-DCCH and the F-CPCCH. The FL PC bits for the F-FCH and the F-DCCH/F-CPCCH may also be sent at other bit rates. A mode may be defined to indicate that the primary and secondary reverse power control subchannels are for the F-FCH and F-DCCH, respectively.

A wireless device may perform power control of the F-FCH using a power control mechanism that comprises an inner loop and an outer loop. For the inner loop, the wireless device receives the reference PC bits on the forward power control subchannel of the F-FCH and estimates the received signal quality of each reference PC bit. The received signal quality may be quantified by an energy-per-bit-to-total-noise-and-interference ratio (Eb/Nt) or some other quantity. The wireless device may filter the received signal quality estimates for multiple reference PC bits to obtain a more reliable estimate. The wireless device then compares the filtered or unfiltered received signal quality estimate for the current power control group against a signal quality threshold, which is also called an F-FCH setpoint. The wireless device may set the FL PC bit for the F-FCH for the current power control group to '0' if the received signal quality estimate is lower than the F-FCH setpoint and to '1' otherwise. A '0' value indicates that the received signal quality is not sufficient and requests an increase in transmit power for the F-FCH. A '1' value indicates that the received signal quality is more than sufficient and requests a decrease in transmit power for the F-FCH.

For the outer loop, the wireless device receives the multicast data sent on the F-FCH, decodes the received multicast data for each frame, and determines whether each received frame is decoded correctly (good) or in error (erased). The wireless device may decrease the F-FCH setpoint by a small down step for each good frame and increase the F-FCH setpoint by a large up step for each erased frame. The up and down step sizes are typically selected to achieve a desired level of performance for the F-FCH, which may be quantified by a target frame erasure rate (e.g., 1% FER).

The F-FCH setpoint may also be fixed, in which case the outer loop is disabled for the F-FCH. The F-FCH setpoint may also be restricted to be at or above a given minimum F-FCH setpoint. The minimum F-FCH setpoint may be set to a level that ensures that erasures do not unnecessarily occur when the wireless device moves to the edge of coverage. A base station may specify the initial, minimum, and/or maximum values for the F-FCH setpoint and may send these values to the wireless devices.

Each base station receives FL PC bits for the F-FCH from all wireless devices receiving the multicast service from that base station. Since the F-FCH is sent to all wireless devices, the base station may adjust the transmit power for the F-FCH based on the FL PC bits received from all wireless devices. For each power control group, the base station determines whether the FL PC bit received from each wireless device is '0' or '1'. The base station then combines the detected FL PC bits for all wireless devices to obtain a PC decision for the power control group. For example, the base station may apply an OR-of-the-UP rule and set the PC decision to '0' (for higher transmit power) if the detected FL PC bit for any wireless device is '0' and set the PC decision to '1' (for lower transmit power) if the detected FL PC bits for all wireless devices are '1'.

The benefits of power control for the F-FCH diminish as the number of wireless devices receiving the multicast service increases. This is due to several factors. First, the likelihood of at least one wireless device requiring high transmit power level (e.g., located at the edge of coverage and having poor channel conditions) increases with greater number of wireless devices. Consequently, the transmit power for the F-FCH is more likely to be set to a high power level with more wireless devices. Second, the likelihood of receiving the FL PC bits from all wireless devices correctly decreases as the number of wireless devices increases. With the OR-of-the-UP rule, an erroneous detection of any FL PC bit as '0' or "UP" results in the transmit power for the F-FCH being increased. Third, more reverse link capacity is consumed to transmit the FL PC bits for the F-FCH with more wireless devices. Power control may thus be selectively performed for the F-FCH based on one or more criteria such as, e.g., the number of wireless devices receiving the multicast service. For example, power control may be enabled for the F-FCH if the number of wireless devices is below a predetermined number and disabled otherwise.

The transmit power for the F-DCCH for each wireless device may be adjusted based on power control, as described below. The transmit power for the F-CPCCH for each wireless device may be set based on the transmit power for the F-DCCH for the wireless device. For example, for a given wireless device, a difference or delta between the transmit power for the F-DCCH and the transmit power for the F-CPCCH may be set by a base station and sent to the wireless device. The transmit powers for the F-DCCH and F-CPCCH may be set in a manner to account for the difference in data rates for the F-DCCH and F-CPCCH.

A wireless device may perform power control of the F-DCCH using another set of inner loop and outer loop. For the inner loop, the wireless device receives the RL PC bits sent on the F-CPCCH for the wireless device and estimates the received signal quality of each RL PC bit. The wireless device may filter the received signal quality estimates for multiple RL PC bits to obtain a more reliable estimate. The wireless device may estimate the received signal quality for the F-DCCH based on the filtered or unfiltered received signal quality estimate for the RL PC bits and the power delta. The received signal quality for the F-CPCCH is thus used as a proxy for the received signal quality for the F-DCCH. The wireless device then compares the received signal quality estimate for the F-DCCH for the current power control group against an F-DCCH setpoint. The wireless device then sets the FL PC bit for the F-DCCH for the current power control group to '0' if the received signal quality estimate is lower than the F-DCCH setpoint and to '1' otherwise. A '0' value indicates that the received signal quality for the F-DCCH is not sufficient and requests an increase in transmit powers for the F-DCCH and F-CPCCH. A '1' value indicates that the received signal quality for the F-DCCH is more than sufficient and requests a decrease in transmit powers for the F-DCCH and F-CPCCH.

For the outer loop, the wireless device receives user-specific signaling sent to the wireless device on the F-DCCH, decodes the signaling sent in each frame, and determines whether each frame is decoded correctly or in error. The wireless device may decrease the F-DCCH setpoint by a small down step for each good frame and increase the F-DCCH setpoint by a large up step for each erased frame. The up and down step sizes are selected to achieve a desired level of performance for the F-DCCH (e.g., 1% FER). The F-DCCH setpoint may be constrained to be within a range of values.

The wireless devices may also perform power control of the F-FCH, F-DCCH, and F-CPCCH for multicast service in other manners. For example, the primary and secondary reverse power control subchannels may be used to carry 400 bps and 50 bps feedback, respectively. The 50 bps feedback may inform the base station whether or not the wireless device has correctly received a 20-ms frame on the F-FCH. The 400 bps feedback may be for continuous adjustment of the F-CPCCH and F-DCCH transmit power levels.

B. Dynamic Coverage and Soft Handoff

Each base station provides communication coverage for a respective geographic area. The coverage areas of neighboring base stations typically overlap to allow a wireless device to be handed off from one base station to another base station as the wireless device moves about the system.

The system may provide dynamic coverage for multicast service. Each wireless device attempts to receive multicast service from the best possible base station(s). The wireless device may periodically search for pilots transmitted by nearby base stations and measure the signal strength of each pilot that the device finds. The wireless device may also periodically measure the signal strength of the pilot from each base station with which the device is currently receiving the multicast service. The wireless device may maintain an "active" set that contains all base stations from which the wireless device is currently receiving the multicast service. The wireless device may try to add a new base station to the active set if the measured pilot signal strength for the new base station exceeds an add threshold. To add the new base station, the wireless device may transmit signaling (e.g., a Pilot Strength Measurement message) on the R-FCH to the current base station. The current base station may transmit signaling (e.g., a Channel Assignment message, a Handoff Direction message, and so on) on the F-DCCH to the wireless device. This signaling contains all information needed by the wireless device to communicate with a new set of base stations. The wireless device may also drop an existing base station from the active set if the measured pilot signal strength for the base station falls below a drop threshold. The active set for multicast service may be maintained in the same manner as for other services supported by the system.

In general, a wireless device may maintain a different active set for each service being received by the wireless device. For example, the wireless device may maintain one active set for the multicast service and another active set for another service (e.g., for a voice or packet data call). The following description is for the active set maintained for the multicast service.

The group of wireless devices receiving the multicast service may be located in the same cell or different cells. Each wireless device in the group may maintain a respective active set that contains all base stations from which the wireless device is receiving the multicast service. The wireless devices may have the same active set or different overlapping active sets for the multicast service. The active sets are overlapping if at least one base station is common to the active sets for multiple ones of the wireless devices receiving the multicast service. For each wireless device, each base station in the device's active set transmits common multicast data on the F-FCH, user-specific signaling on the F-DCCH, and RL PC bits on the F-CPCCH to the wireless device.

A wireless device is in soft handoff for the multicast service if its active set contains multiple sectors that belong to one or more base stations. While in soft handoff, the multiple sectors transmit the same multicast data via different F-FCHs used by these sectors for the multicast service. The wireless device may receive and combine the multicast data from all sectors in the active set to obtain improved performance. The multiple sectors may also send the same user-specific signaling to the wireless device via different F-DCCHs used by these sectors for the multicast service. The multiple sectors may coordinate the transmissions of the user-specific signaling so that each message is sent simultaneously from all sectors. This allows the wireless device to receive and combine messages from all sectors for improved performance. The multiple base stations may (e.g., periodically) perform transmit power balancing/alignment to adjust the transmit powers for the shared forward link channels toward a common level. The use of balanced transmit powers by all sectors transmitting the same content may enhance diversity and improve link efficiency.

When there are multiple base stations in the active set in soft handoff, each base station in the active set may transmit a separate forward power control subchannel to adjust the transmit power of the wireless device for the reverse link. Each base station generates RL PC bits for the wireless device based on received signal quality measurements made by that base station for the wireless device. For each power control group, the wireless device can detect the RL PC bits received from all base stations in the active set and adjust its transmit power accordingly. The wireless device may apply an OR-of-the-DOWN rule and decrease its transmit power if any detected RL PC bit for the current power control group is '1' (to decrease transmit power) and increase its transmit power if all detected RL PC bits for the current power control group are '0' (to increase transmit power).

All base stations in the system may support shared forward link channels (the F-FCH, F-DCCH, and F-CPCCH) for multicast service. In this case, a wireless device may perform a soft handoff in a normal manner using conventional soft handoff procedures. The wireless device is informed of all pertinent parameters (e.g., the common long code mask, Walsh functions, and so on) used for the shared forward link channels by each base station in the active set.

The system may have some base stations that support the shared forward link channels and some "legacy" base stations that do not support the shared forward link channels. A legacy base station may use a dedicated F-FCH to support multicast service for a wireless device. The legacy base station may transmit multicast data on the dedicated F-FCH using the unique long code mask for the wireless device, the common long code mask used for the shared F-FCH by another base station, or some other long code mask. The legacy base station may also transmit RL PC bits for the wireless device (instead of reference PC bits) on the forward power control subchannel of the dedicated F-FCH. The base station may send user-specific signaling on a dedicated F-DCCH to the wireless device.

A wireless device may perform a soft handoff or a hard handoff from a first base station that supports the shared forward link channels to a second (legacy) base station that does not support the shared forward link channels. A soft handoff may be performed by assigning the wireless device with dedicated forward link channels by both base stations. For example, the wireless device may originally receive multicast data on a shared F-FCH (e.g., with Walsh function of 17) from the first base station. For soft handoff, the wireless device may continue to receive multicast data on a first dedicated F-FCH (e.g., with Walsh function of 19) from the first base station and on a second dedicated F-FCH (e.g., with Walsh function 20) from the second base station. A hard handoff may be performed by first moving the wireless device to dedicated forward link channels by the first base station and then performing the hard handoff to the second base station using conventional hard handoff procedures. If the wireless device thereafter moves back into the coverage area of the first base station, then the wireless device may perform a handoff to the first base station and receive multicast service on the shared forward link channels.

A wireless device may also concurrently receive multicast service via shared and dedicated F-FCHs from multiple base stations for soft handoff. The wireless device may go from receiving multicast data on only a shared F-FCH to receiving multicast data on both shared and dedicated F-FCHs. In this case, the initial transmit power of the dedicated F-FCH (which is being added) may be set by the transmit power of the shared F-FCH. The wireless device may also go from receiving multicast data on only a dedicated F-FCH to receiving multicast data on both shared and dedicated F-FCHs. In this case, the initial transmit power of the shared F-FCH (which is being added) may be set to the higher of the transmit power of the shared F-FCH (which is already being transmitted to other wireless devices) and the transmit power of the dedicated F-FCH.

If a wireless device is receiving both shared and dedicated F-FCHs, e.g., a shared F-FCH from one base station and a dedicated F-FCH from another base station, then the wireless device would receive a forward power control subchannel on the F-CPCCH from the base station transmitting the shared F-FCH and another forward power control subchannel on the dedicated F-FCH from the base station transmitting this F-FCH. The transmit powers for these forward power control subchannels may be adjusted based on the FL PC bits sent on the secondary power control subchannel by the wireless device. These FL PC bits may be derived (1) based on the reference PC bits sent on the shared F-FCH and the RL PC bits sent on the dedicated F-FCH and/or (2) applying the OR-of-the-UP rule on the measurements for the two base stations to derive the FL PC bits for these base stations. The transmit power for the forward power control subchannel of the dedicated F-FCH may also be adjusted in conjunction with the transmit power for the dedicated F-FCH.

A wireless device typically employs a rake receiver to process multiple signal instances received from one or more base stations. Each signal instance of sufficient energy is assigned to and processed by a demodulation element (or a "finger") of the rake receiver to obtain symbol estimates. The symbol estimates from all assigned fingers are then combined. The combined symbols are further descrambled with a long code to obtain demodulated symbols, which are then decoded. If the symbol estimates are first combined across fingers and then descrambled, then the same long code mask should be used by all base stations whose transmissions are to be combined by the wireless device.

The same long code mask is typically used for the F-FCH and F-DCCH for unicast service. For multicast service, each wireless device is aware of the common long code mask used for the F-FCH and the unique long code mask used for the signaling on the F-DCCH. The wireless device may then descramble the combined symbols for the F-FCH and F-DCCH based on the common and unique long code masks, respectively. For a wireless device in soft handoff, the same long code mask is typically used by all base stations in the device's active set. This allows the wireless device to combine the symbol estimates for all of these base stations. Thus, the soft handoff and hard handoff may be performed in a manner to take into account the combining and descrambling performed by the wireless device.

Figure 6:
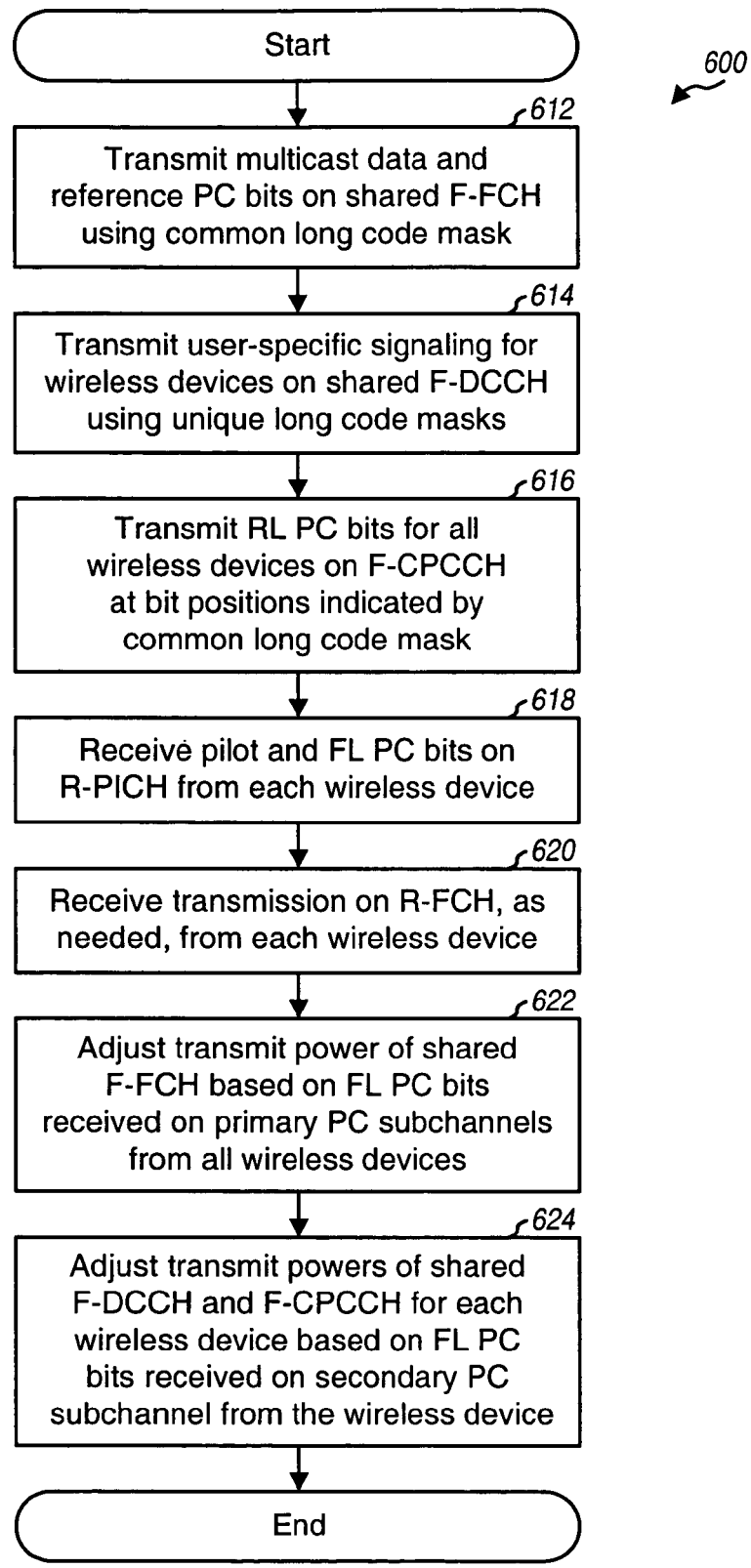
FIG. 6 shows a process for providing multicast service by a base station.

FIG. 6 shows a flow diagram of a process 600 performed by a base station to provide multicast service for multicast scheme 1. The base station transmits multicast data and reference PC bits on the F-FCH using the common long code mask (block 612). The base station transmits user-specific signaling to the wireless devices on the F-DCCH using the unique long code masks for these wireless devices (block 614). The base station also transmits RL PC bits for the wireless devices on the F-CPCCH at bit positions indicated by the common long code mask (block 616). The base station receives pilot and FL PC bits from each wireless device on the R-PICH (block 618) and receives data/signaling from each wireless device on the R-FCH, as needed (block 620). The base station adjusts the transmit power of the F-FCH based on the FL PC bits received on the primary power control subchannels from all wireless devices (block 622). The base station adjusts the transmit powers of the F-DCCH and F-CPCCH for each wireless device based on the FL PC bits received on the secondary power control subchannel from the wireless device (block 624).

Figure 7:
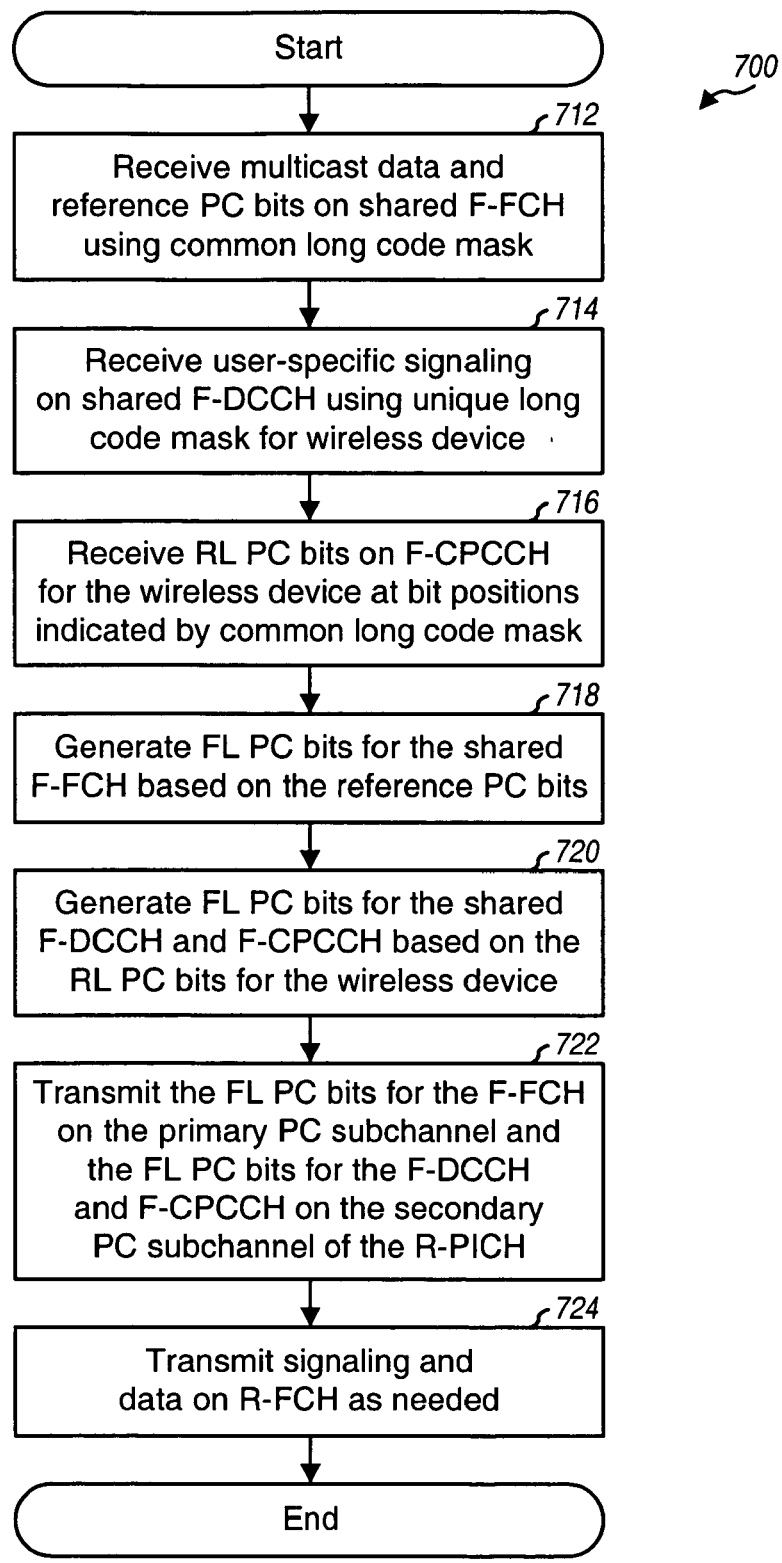
FIG. 7 shows a process for receiving multicast service by a wireless device.

FIG. 7 shows a flow diagram of a process 700 performed by a given wireless device to receive multicast service for multicast scheme 1. The wireless device receives multicast data and reference PC bits on the F-FCH using the common long code mask (block 712). The wireless device receives its signaling on the F-DCCH using the unique long code mask for the wireless device (block 714). The wireless device also receives its RL PC bits on the F-CPCCH at bit positions indicated by the common long code mask (block 716). The wireless device generates FL PC bits for the F-FCH based on the reference PC bits received on the F-FCH (block 718). The wireless device also generates FL PC bits for the F-DCCH and F-CPCCH based on the RL PC bits sent to the wireless device on the F-CPCCH (block 720). The wireless device transmits the FL PC bits for the F-FCH on the primary power control subchannel and the FL PC bits for the F-DCCH and F-CPCCH on the secondary power control subchannel of the R-PICH (block 722). The wireless device also transmits data/signaling as needed on the R-FCH (block 724).

2. Multicast Scheme 2: F-FCH & F-CPCCH

Multicast scheme 2 provides multicast service using the shared F-FCH and F-CPCCH for the forward link and the R-FCH and R-PICH for each wireless device for the reverse link. The F-FCH is used to send common multicast data to all wireless devices as well as user-specific signaling to individual wireless devices. This may be achieved by using the common long code mask for the multicast data and the unique long code masks for the user-specific signaling. Each wireless device can recover the multicast data with the common long code mask and its own signaling using its unique long code mask. The transmission on the F-FCH in each frame may or may not be signaled to the wireless devices. If such signaling is not sent, then each wireless device may attempt to recover each frame with both the common and unique long code masks. The F-CPCCH is used to send RL PC bits to the wireless devices. Each wireless device transmits a pilot and FL PC bits on the R-PICH and also transmits on the R-FCH when necessary. The F-DCCH is not used to send user-specific signaling for this multicast scheme, and one or more Walsh functions are saved relative to multicast scheme 1.

For forward link power control, the reverse power control subchannel on the R-PICH may be partitioned into primary and secondary reverse power control subchannels (e.g., 400 bps and 400 bps), which may be used to control the transmit powers of the F-FCH and F-CPCCH. The base station may receive primary and secondary reverse power control subchannels from all wireless devices receiving the multicast service. The base station may apply the OR-of-the-UP rule on the FL PC bits received on the primary reverse power control subchannels from the wireless devices to adjust the transmit power used for the multicast data sent on the F-FCH. The base station may adjust the transmit power used for the user-specific signaling sent on the F-FCH to each wireless device based on the FL PC bits received from the wireless device on the secondary power control subchannel.

A wireless device may concurrently receive multicast service from multiple base stations for soft handoff. These base stations may transmit multicast data to the wireless device via shared F-FCHs and may transmit RL PC bits for the wireless device via F-CPCCHs. The wireless device may measure the RL PC bits received on the F-CPCCHs from the multiple base stations, determine which base stations have sufficient received signal strength at the wireless device, generate FL PC bits based on the measured RL PC bits for all sufficiently received base stations, and send the FL PC bits on the secondary power control subchannel to the base stations. Each base station then adjusts the transmit powers for the signaling on the F-FCH and the RL PC bits on the F-CPCCH for the wireless device based on the FL PC bits received on the secondary power control subchannel from the wireless device. The transmit powers for the F-FCHs and F-CPCCHs for different base stations may thus be independently controlled by each base station.

3. Multicast Scheme 3: F-FCH & Dedicated F-DCCHs

Multicast scheme 3 provides multicast service using (1) for the forward link—a shared F-FCH for all wireless devices and a dedicated F-DCCH for each wireless device and (2) for the reverse link—an R-PICH and an R-DCCH for each wireless device. The shared F-FCH is used to send multicast data to all wireless devices. The dedicated F-DCCH is used to send user-specific signaling as well as RL PC bits to a specific wireless device. The F-DCCH may be configured to carry a forward power control subchannel on the dedicated F-DCCH in similar manner as that described above for the F-FCH and shown in FIG. 3. The forward power control subchannel may be used to send RL PC bits to the wireless device. Each wireless device transmits a pilot and FL PC bits on the R-PICH and also transmits signaling on an R-DCCH when necessary. The F-CPCCH and R-FCH are not used for this multicast scheme.

For forward link power control, the reverse power control subchannel on the R-PICH may be partitioned into primary and secondary reverse power control subchannels (e.g., 400 bps and 400 bps), which may be used to control the transmit powers of the shared F-FCH and the dedicated F-DCCH, respectively. The base station may receive FL PC bits on the primary reverse power control subchannels from all wireless devices and may apply the OR-of-the-UP rule on these FL PC bits to adjust the transmit power for the shared F-FCH. The base station may receive FL PC bits on the secondary power control subchannel from each wireless device and may adjust the transmit power of the dedicated F-DCCH for the wireless device. The transmit power for the RL PC bits may be tied to the transmit power for the signaling on the dedicated F-DCCH. Each wireless device may estimate the received signal quality of the RL PC bits received on the dedicated F-DCCH, compare the received signal quality against an F-DCCH setpoint, and generate FL PC bits for the dedicated F-DCCH accordingly. The F-DCCH setpoint may be adjusted based on frame erasures on the dedicated F-DCCH. Since signaling may be sent intermittently on the dedicated F-DCCH, it may take an extended period of time to adjust the setpoint for the dedicated F-DCCH downward based on good frames. The setpoint for the dedicated F-DCCH may thus be a fixed value or may be constrained to be within a range of values.

4. Multicast Scheme 4: F-SCH without Reverse Link

Multicast scheme 4 provides multicast service using an F-SCH and an F-CCCH. The F-SCH is used to send multicast data to the wireless devices and may support variable rates (e.g., full, half, quarter, and eighth rates), similar to an F-FCH that supports voice without a reverse link connection. The F-CCCH is used to send user-specific signaling to the wireless devices. An overhead channel (e.g., a broadcast control channel (F-BCCH) or a paging channel) may be used to send configuration information for the F-SCH and F-CCCH, such as the rates used for these forward link channels. Reverse link connections are not maintained for the wireless devices for this multicast scheme. A wireless device may obtain dynamic coverage for the multicast service by bringing up a reverse link connection whenever the device moves into the coverage area of another base station and sending the appropriate signaling via the reverse link connection. Since power control feedback is not available without a reverse link connection, the F-SCH and F-CCCH may be transmitted at sufficient transmit power levels to ensure reliable reception even at the edge of the coverage area.

5. Multicast Scheme 5: F-FCH, F-PDCH, and F-CPCCH

Multicast scheme 5 provides multicast service using (1) a shared F-FCH, at least one F-PDCH, and at least one F-CPCCH for the forward link and (2) a Reverse Quality Indicator Channel (R-CQICH) and a Reverse Acknowledgment Channel (R-ACKCH) for each wireless device for the reverse link. The shared F-FCH is used to send multicast data to the wireless devices. Each F-PDCH may be used to send user-specific signaling to individual wireless devices. One to 28 Walsh functions may be used for each F-PDCH. Each wireless device may be assigned a unique Walsh function for one F-PDCH and would then receive its signaling with that Walsh function on the F-PDCH. The F-CPCCH is used to send RL PC bits to the wireless devices.

Each wireless device may transmit FL PC bits on the R-CQICH and/or the R-ACKCH. Two reverse power control subchannels may be used to adjust the transmit power of the F-FCH and the F-PDCH/F-CPCCH for the wireless device. The wireless device may measure the reference PC bits sent on the F-FCH, set the FL PC bits for the F-FCH accordingly based on the measurements, and send the FL PC bits on the primary reverse power control subchannel. The setpoint for the F-FCH may be fixed or adjusted based on frame erasures for the F-FCH. The transmit power for the F-PDCH may be fixed or adjusted based on FL PC bits on the secondary reverse power control subchannel.

Five exemplary multicast schemes for providing multicast service using various combinations of forward and reverse link channels have been described above. Multicast service may also be provided in other manners based on other multicast schemes and using different combinations of forward and reverse link channels.

A wireless device may receive multicast service in conjunction with a dedicated call (e.g., a voice call). The wireless device may be assigned a dedicated F-FCH for the dedicated call. User-specific signaling for the dedicated call may be sent on a dedicated F-DCCH, the shared F-DCCH used for the multicast service, or some other forward link channel. A wireless device may also be assigned a dedicated or shared F-SCH for higher data rate. The reverse power control subchannel on the R-PICH may be partitioned into three or more subchannels, one subchannel for each forward link channel to be power controlled separately by the wireless device.

6. System

Figure 8:
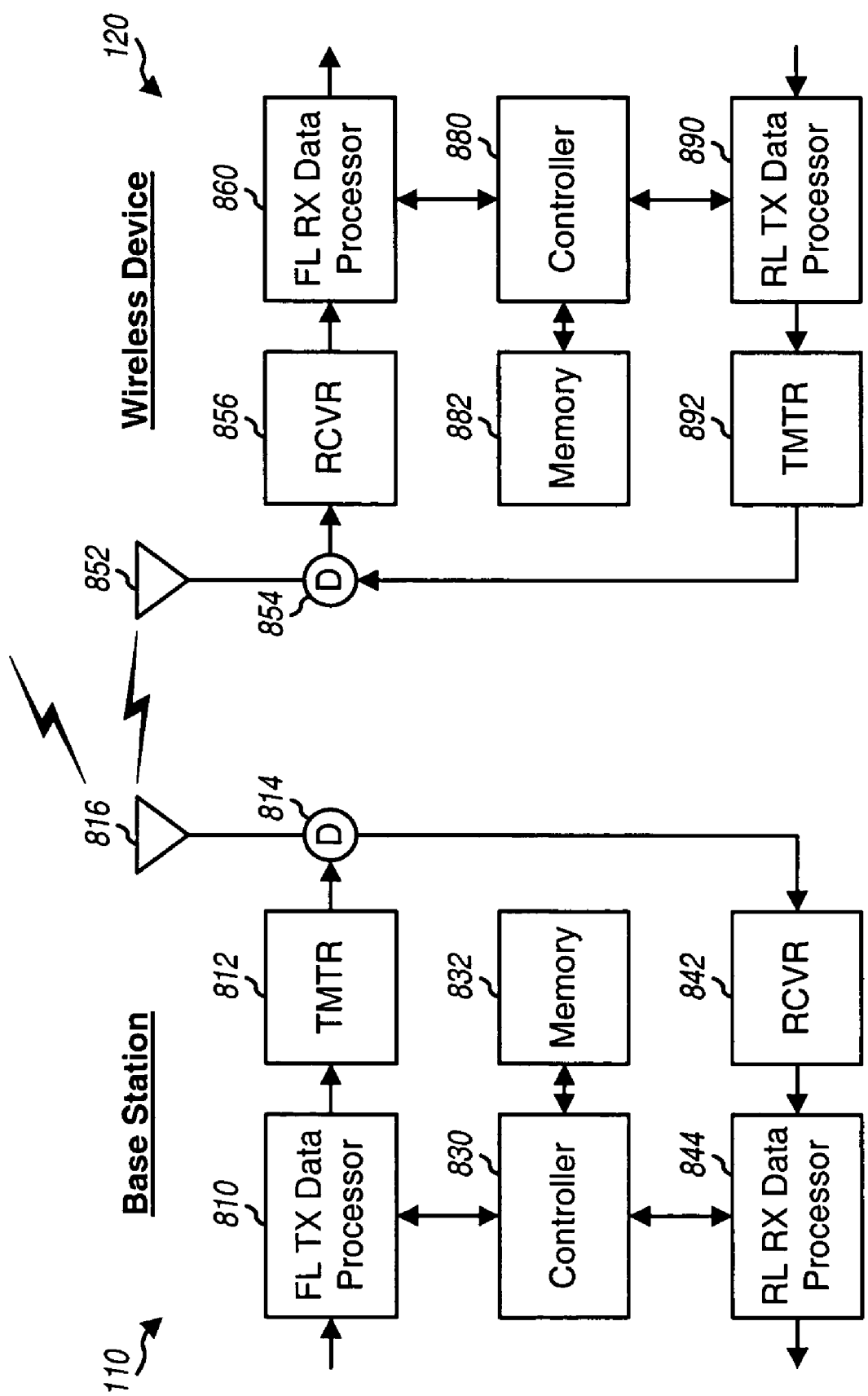
FIG. 8 shows a block diagram of the base station and the wireless device.

FIG. 8 shows a block diagram of a base station 110 providing multicast service and a wireless device 120 receiving the multicast service. For the forward link, at base station 110, an FL transmit (TX) data processor 810 receives various types of data (e.g., multicast data, signaling, and RL PC bits), processes (e.g., encodes, interleaves, modulates, channelizes, and scrambles) the received data for transmission on forward link channels (e.g., the F-FCH, F-DCCH, and F-CPCCH), and provides a stream of data chips. A transmitter unit (TMTR) 812 conditions (e.g., converts to analog, amplifies, filters, and frequency upconverts) the data chips to generate a forward link signal. The forward link signal is routed through a duplexer (D) 814 and transmitted via an antenna 816. At wireless device 120, the forward link signal is received by an antenna 852, routed through a duplexer 854, and provided to a receiver unit (RCVR) 856. Receiver unit 856 conditions (e.g., filters, amplifies, frequency downconverts, and digitizes) the received signal to obtain data samples. An FL receive (RX) data processor 860 processes (e.g., dechannelizes, data demodulates, descrambles, deinterleaves, and decodes) the data samples to obtain decoded data for wireless device 120. The decoded data includes the multicast data sent on the F-FCH and the user-specific signaling sent on the F-DCCH for wireless device 120. FL RX data processor 860 may implement a rake receiver that can process multiple signal instances.

For the reverse link, at wireless device 120, an RL TX data processor 890 receives and processes various types of data (e.g., FL PC bits and reverse link signaling) for transmission on reverse link channels (e.g., the R-PICH and R-FCH). A transmitter unit 892 then conditions a stream of data chips from RL TX data processor 890 to generate a reverse link signal, which is routed through duplexer 854 and transmitted via antenna 852. At base station 110, the reverse link signal is received by antenna 816, routed through duplexer 814, and provided to a receiver unit 842. Receiver unit 842 conditions the received signal and provides a sample stream. An RL RX data processor 844 processes the sample stream and recovers the FL PC bits and signaling sent by each wireless device receiving the multicast service.

Controllers 830 and 880 direct the operation of various units within base station 110 and wireless device 120, respectively. Controller 830 and 880 may perform various functions for multicast service, power control, soft handoff, and so on. Memory units 832 and 882 store data and program codes used by controllers 830 and 880, respectively. The processing by base station 110 and wireless device 120 for multicast scheme 1 is described below.

Figure 9:
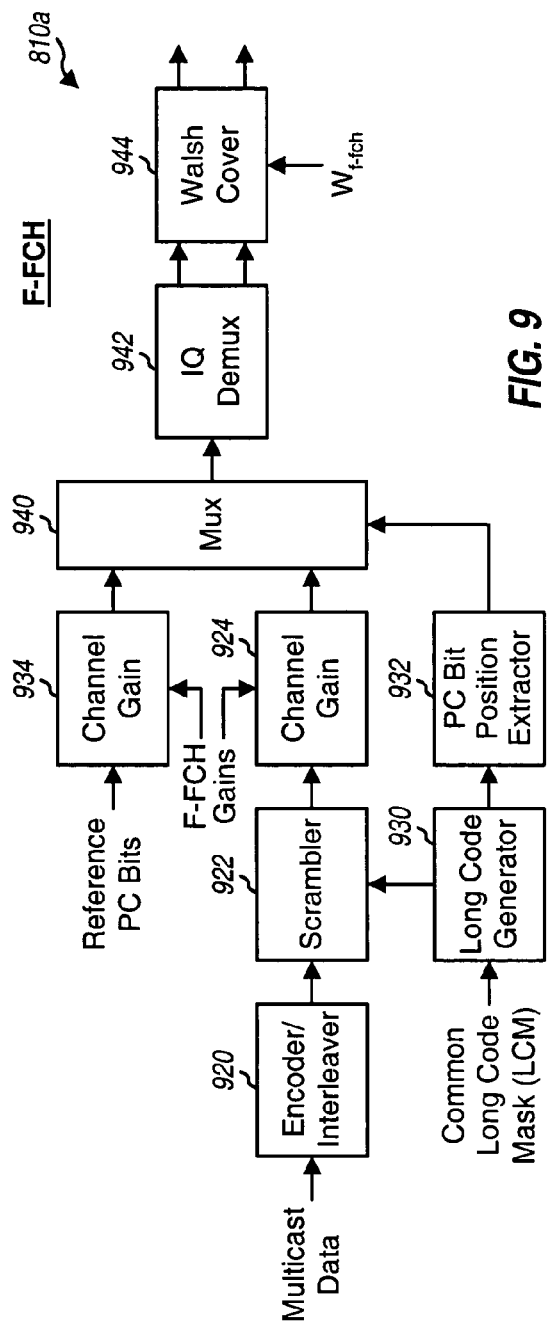
FIG. 9 shows a data processor for the F-FCH.

FIG. 9 shows a block diagram of a data processor 810*a* for the F-FCH. Data processor 810*a* is part of FL TX data processor 810 in FIG. 8. Within data processor 810*a*, multicast data is encoded and interleaved by an encoder/interleaver 920, further scrambled with a common long code by a scrambler 922, and scaled with a gain for the data portion of the F-FCH by a channel gain unit 924. A long code generator 930 generates the common long code for scrambler 922 based on the common long code mask for the F-FCH. Reference PC bits are scaled with a gain for the reference PC bits by a channel gain unit 934. The gains for the multicast data and reference PC bits are related and determined by the bit rates for the multicast data and PC bits. A multiplexer (Mux) 940 receives the outputs from units 924 and 934 and punctures in the scaled reference PC bits onto the scaled multicast data at bit positions indicated by a PC bit position extractor 932. An IQ demultiplexer (Demux) 942 demultiplexes the output of multiplexer 940 into inphase (I) and quadrature (Q) streams. A Walsh cover unit 944 covers the I and Q streams with a Walsh function $W_{f\text{-}fch}$ for the F-FCH.

Figure 10:
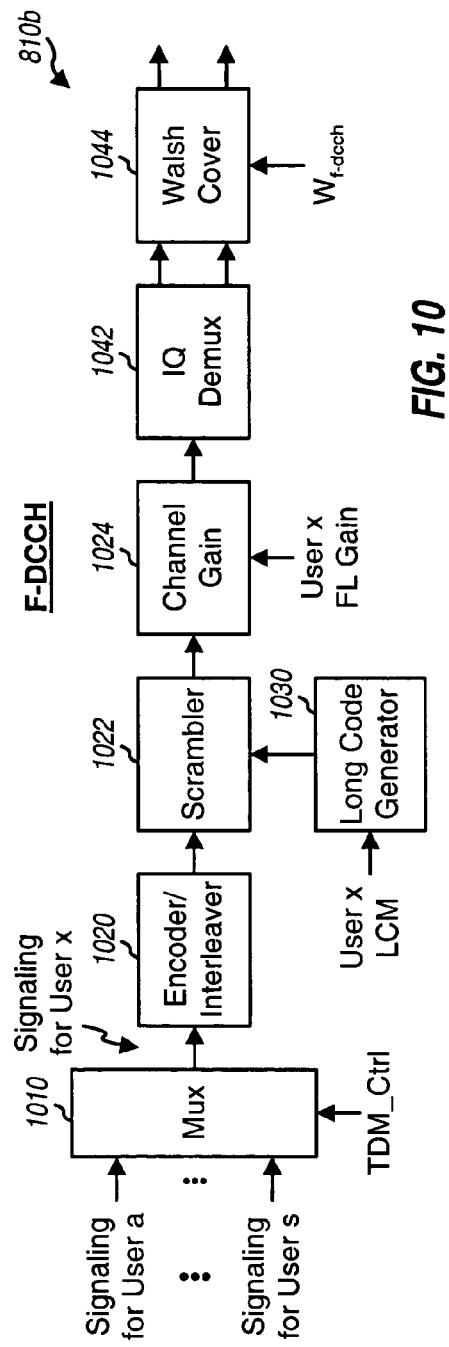
FIG. 10 shows a data processor for an F-DCCH.

FIG. 10 shows a block diagram of a data processor 810*b* for the F-DCCH. Data processor 810*b* is also part of FL TX data processor 810 in FIG. 8. Within data processor 810*b*, a multiplexer 1010 receives signaling for users a through s, who are receiving the multicast service, and provides the signaling for one user at a time based on a TDM_Ctrl signal. The signaling for selected user x, where x∈{a . . . s}, is processed by an encoder/interleaver 1020, scrambled with a long code for user x by a scrambler 1022, scaled with a gain for user x by a channel gain unit 1024, demultiplexed into I and Q streams by an IQ demultiplexer 1042, and covered with a Walsh function $W_{f\text{-}dcch}$ for the F-DCCH by a Walsh cover unit 1044. A long code generator 1030 generates the long code for user x based on the unique long code mask for user x. The signaling for each user is scrambled with a long code and scaled with a gain for that user.

Figure 11:
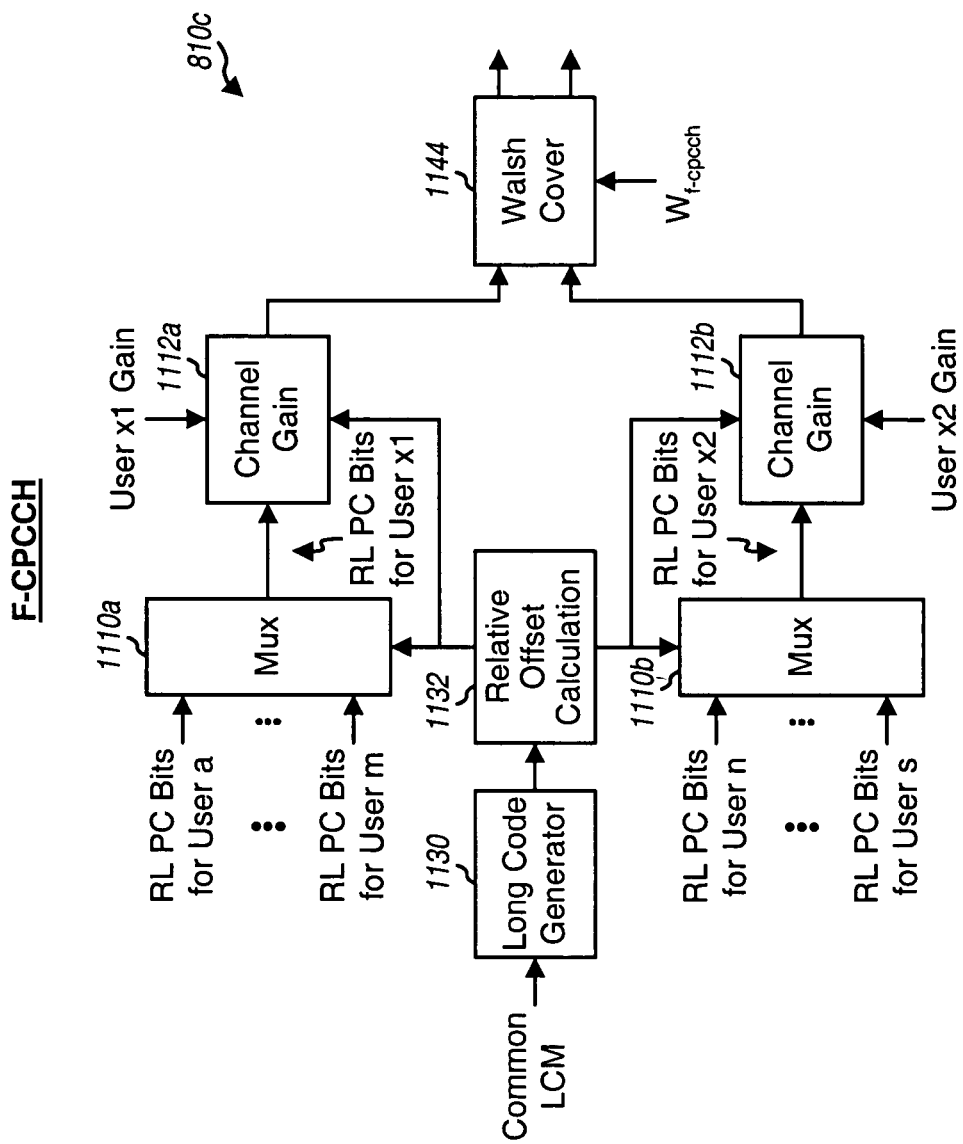
FIG. 11 shows a data processor for an F-CPCCH.

FIG. 11 shows a block diagram of a data processor 810*c* for the F-CPCCH. Data processor 810*c* is also part of FL TX data processor 810 in FIG. 8. Within data processor 810*c*, a multiplexer 1110*a* receives RL PC bits for users a through m and a multiplexer 1110*b* receives RL PC bits for users n through s. Each multiplexer 1110 maps the RL PC bits for its users onto bit positions determined by a relative offset calculation unit 1132. Channel gain units 1112*a* and 1112*b* receive the RL PC bits from multiplexers 1110*a* and 1110*b*, respectively. Each channel gain unit 1112 scales the RL PC bits for each user with a gain for that user. A Walsh cover unit 1144 covers the scaled RL PC bits from units 1112*a* and 1112*b* with a Walsh function $W_{f\text{-}cpcch}$ for the F-CPCCH. A long code generator 1130 generates the common long code based on the common long code mask. Unit 1132 determines the bit positions for the RL PC bits based on the common long code.

Figure 12:
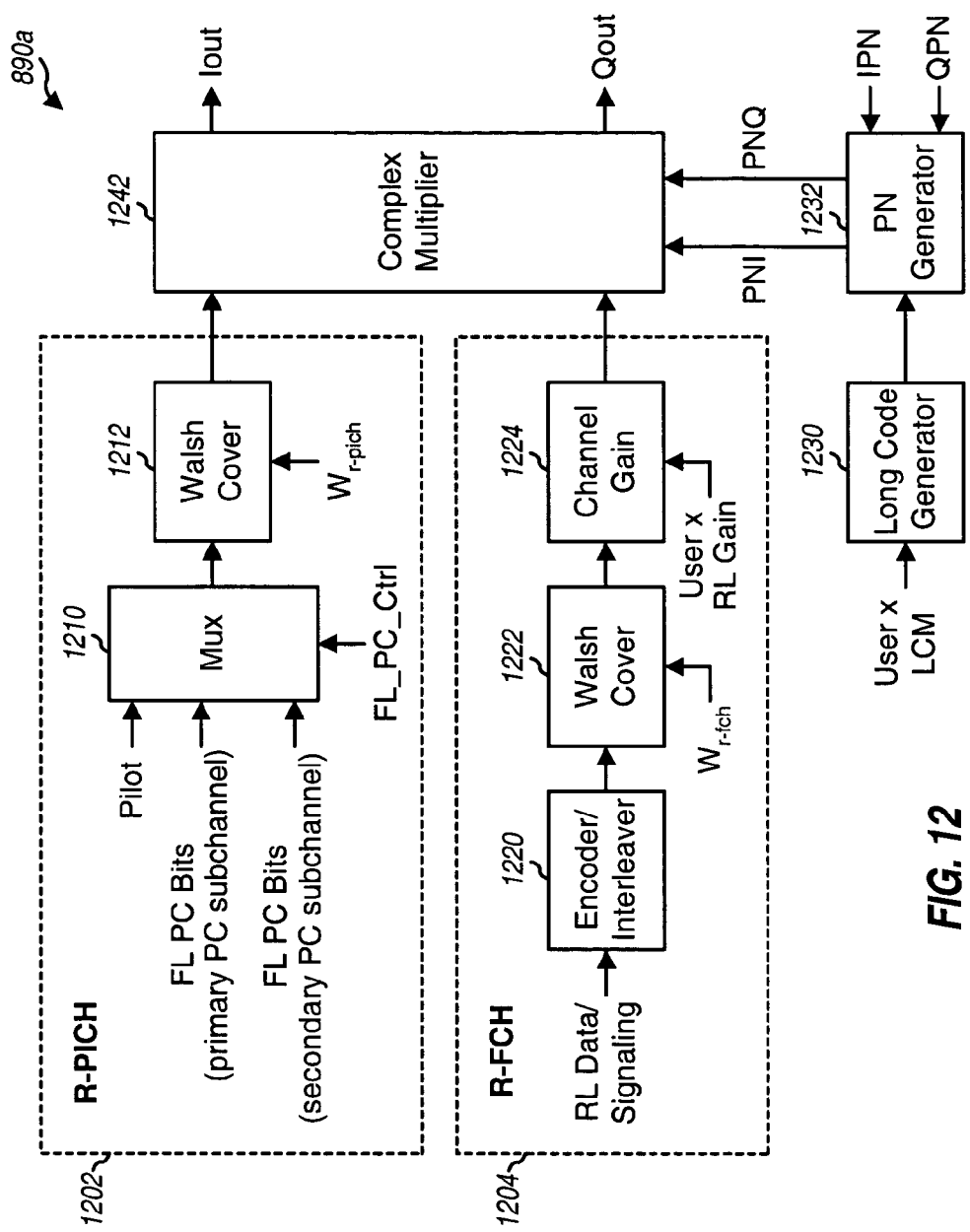
FIG. 12 shows a data processor for an R-PICH and an R-FCH.

FIG. 12 shows a block diagram of a data processor 890*a* for the R-PICH and R-FCH for user x. Data processor 890*a* is part of RL TX data processor 890 in FIG. 8. Within a data processor 1202 for the R-PICH, a multiplexer 1210 receives pilot data and FL PC bits for the primary and secondary reverse power control subchannels. Multiplexer 1210 multiplexes the pilot data and the FL PC bits on the R-PICH, as shown in FIGS. 4 and 5. A Walsh cover unit 1212 covers the output of multiplexer 1210 with a Walsh function $W_{r\text{-}pich}$ for the R-PICH. Within a data processor 1204 for the R-FCH, reverse link data and signaling are processed by an encoder/interleaver 1220, covered with a Walsh function $W_{r\text{-}fch}$ for the R-FCH by a Walsh cover unit 1222, and scaled with a gain for user x by a channel gain unit 1224. A long code generator 1230 generates the long code for user x based on the unique long code mask for user x. A PN generator 1232 generates PNI and PNQ sequences based on the long code for user x and the common IPN and QPN sequences used for all wireless devices. A complex multiplexer 1242 multiples the outputs of data processors 1202 and 1204 with the PNI and PNQ sequences and generates a stream of Iout and Qout data chips, which is further processed by transmitter unit 892. The transmission on the R-PICH and/or the R-FCH may be gated (e.g., to ½ or ¼) or disabled.

The dynamic shared forward link channel described herein may be used for various applications such as push-to-talk (PTT). In general, the dynamic shared forward link channel may be used to send any common traffic data to any group of wireless devices. The dynamic shared forward link channel may or may not be jointly power controlled.

The techniques for transmitting and receiving data on the dynamic shared forward link channel may be implemented by various means, e.g., in hardware, software, or a combination thereof. For a hardware implementation, the processing units for data transmission may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units for data reception may also be implemented within one or more ASICs, DSPs, and so on.

For a software implementation, the processing for data transmission and reception may be implemented with modules (e.g., procedures, functions, and so on) that perform the functions described herein. The software codes may be stored in a memory unit (e.g., memory units 832 and 882 in FIG. 8) and executed by a processor (e.g., controllers 830 and 880). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting data to a plurality of wireless devices in a wireless communication system, comprising:
   transmitting traffic data to the plurality of wireless devices via a shared data channel;
   transmitting user-specific signaling to each of the plurality of wireless devices via a shared control channel used for the plurality of wireless devices or a dedicated control channel used for the wireless device, wherein the traffic data and the user-specific signaling are for a multicast service; and
   transmitting reference bits on the shared data channel, the reference bits having a known value and a fixed offset transmit power level different than the traffic data and being used for signal quality estimation of the shared data channel.

2. The method of claim 1, further comprising:
   transmitting power control information to each of the plurality of wireless devices via a shared indicator channel used for the plurality of wireless devices or the dedicated control channel used for the wireless device.

3. The method of claim 2, wherein the shared data channel is a forward fundamental channel (F-FCH), the shared control channel is a forward dedicated control channel (F-DCCH), and the shared indicator channel is a forward common power control channel (F-CPCCH) in IS-2000.

4. The method of claim 2, wherein the shared data channel is a forward fundamental channel (F-FCH), the shared control channel is also the F-FCH, and the shared indicator channel is a forward common power control channel (F-CPCCH) in IS-2000.

5. The method of claim 2, wherein the shared data channel is a forward fundamental channel (F-FCH) and the dedicated control channel is a forward dedicated control channel (F-DCCH) in IS-2000.

6. The method of claim 2, wherein the shared data channel is a forward supplemental channel (F-SCH) and the shared control channel is a forward common control channel (F-CCCH) in IS-2000.

7. The method of claim 2, wherein the shared data channel is a forward fundamental channel (F-FCH), the shared control channel is a forward packet data channel (F-PDCH), and the shared indicator channel is a forward common power control channel (F-CPCCH) in IS-2000.

8. The method of claim 1, further comprising: maintaining a reverse link connection for each of the plurality of wireless devices.

9. A method of transmitting data to a plurality of wireless devices in a wireless communication system, comprising:
   transmitting traffic data to the plurality of wireless devices via a forward fundamental channel (F-FCH);
   transmitting user-specific signaling to each of the plurality of wireless devices via a forward dedicated control channel (F-DCCH); and
   transmitting reference power control (PC) bits on the F-FCH, the reference PC bits having a known value and a fixed offset transmit power level different than the traffic data and being used for signal quality estimation of the F-FCH.

10. The method of claim 9, wherein the user-specific signaling for the plurality of wireless devices are transmitted on the F-DCCH using time division multiplexing (TDM).

11. The method of claim 9, further comprising:
    scrambling the traffic data for the F-FCH with a long code generated using a common long code mask for the F-FCH.

12. The method of claim 9, further comprising:
    scrambling the user-specific signaling for each wireless device with a long code generated using a unique long code mask for the wireless device.

13. The method of claim 9, further comprising:
    transmitting reverse link (RL) PC information to each of the plurality of wireless devices via a forward common power control channel (F-CPCCH).

14. The method of claim 13, wherein the RL PC information for each wireless device is sent on a respective forward power control subchannel assigned to the wireless device, and wherein a plurality of forward power control subchannels for the plurality of wireless devices are time division multiplexed on the F-CPCCH.

15. The method of claim 13, further comprising:
    multiplexing the RL PC information for the plurality of wireless devices onto the F-CPCCH based on a long code generated using a common long code mask.

16. The method of claim 13, further comprising:
    receiving forward link (FL) PC bits for the F-DCCH from each of the plurality of wireless devices; and
    adjusting transmit power of the RL PC bits sent on the F-CPCCH to each wireless device based on the FL PC bits received from the wireless device for the F-DCCH.

17. The method of claim 9, further comprising: receiving forward link (FL) PC bits for the F-FCH from the plurality of wireless devices; and adjusting transmit power of the F-FCH based on the FL PC bits received for the F-FCH.

18. The method of claim 17, wherein the FL PC bits for the F-FCH are generated by each wireless device based on the reference PC bits transmitted on the F-FCH.

19. The method of claim 17, further comprising:
determining a PC decision for each time interval based on FL PC bits received from the plurality of wireless devices for the time interval and using an OR-of-the-UP rule, and wherein the transmit power of the F-FCH is adjusted based on the PC decision.

20. The method of claim 17, further comprising:
disabling adjustment of the transmit power for the F-FCH if a predetermined number of wireless devices or more are receiving the traffic data on the F-FCH.

21. The method of claim 9, further comprising:
receiving forward link (FL) PC bits for the F-DCCH from each of the plurality of wireless devices; and
adjusting transmit power of the user-specific signaling sent on the F-DCCH to each wireless device based on the FL PC bits received from the wireless device for the F-DCCH.

22. The method of claim 9, wherein the traffic data is sent to each of the plurality of wireless devices as the wireless device moves about the system.

23. The method of claim 9, further comprising:
receiving pilot and forward link (FL) PC information from each of the plurality of wireless devices via a reverse pilot channel (R-PICH).

24. The method of claim 9, further comprising:
receiving reverse link signaling from a wireless device via a reverse fundamental channel (R-FCH).

25. An apparatus in a wireless communication system, comprising:
a first data processor operative to process traffic data for transmission on a forward fundamental channel (F-FCH) to a plurality of wireless devices and to process reference power control (PC) bits for transmission on the F-FCH, the reference PC bits having a known value and a fixed offset transmit power level different than the traffic data and being used for signal quality estimation of the F-FCH; and
a second data processor operative to process user-specific signaling for each of the plurality of wireless devices for transmission on a forward dedicated control channel (F-DCCH).

26. The apparatus of claim 25, further comprising:
a third data processor operative to process reverse link (RL) PC information for each of the plurality of wireless devices for transmission on a forward common power control channel (F-CPCCH).

27. The apparatus of claim 25, wherein the first data processor is operative to scramble the traffic data for the F-FCH with a long code generated using a common long code mask for the F-FCH.

28. The apparatus of claim 25, wherein the second data processor is operative to scramble the user-specific signaling for each wireless device with a long code generated using a unique long code mask for the wireless device.

29. The apparatus of claim 25, further comprising:
a controller operative to receive forward link (FL) PC bits for the F-FCH from the plurality of wireless devices and to adjust transmit power of the F-FCH based on the FL PC bits received for the F-FCH.

30. The apparatus of claim 25, further comprising:
a controller operative to receive forward link (FL) PC bits for the F-DCCH from each of the plurality of wireless devices and to adjust transmit power of the user-specific signaling sent on the F-DCCH to each wireless device based on the FL PC bits received from the wireless device for the F-DCCH.

31. An apparatus in a wireless communication system, comprising:
means for transmitting traffic data to a plurality of wireless devices via a forward fundamental channel (F-FCH);
means for transmitting user-specific signaling to each of the plurality of wireless devices via a forward dedicated control channel (F-DCCH); and
means for transmitting reference power control (PC) bits on the F-FCH, the reference PC bits having a known value and a fixed offset transmit power level different than the traffic data and being used for signal quality estimation of the F-FCH.

32. The apparatus of claim 31, further comprising:
means for scrambling the traffic data for the F-FCH with a long code generated using a common long code mask for the F-FCH.

33. The apparatus of claim 31, further comprising:
means for scrambling the user-specific signaling for each wireless device with a long code generated using a unique long code mask for the wireless device.

34. The apparatus of claim 31, further comprising:
means for receiving forward link (FL) PC bits for the F-FCH from the plurality of wireless devices; and
means for adjusting transmit power of the F-FCH based on the FL PC bits received for the F-FCH.

35. The apparatus of claim 31, further comprising:
means for receiving forward link (FL) PC bits for the F-DCCH from each of the plurality of wireless devices; and
means for adjusting transmit power of the user-specific signaling sent on the F-DCCH to each wireless device based on the FL PC bits received from the wireless device for the F-DCCH.

36. A method of receiving data in a wireless communication system, comprising:
receiving traffic data via a shared data channel sent to a plurality of wireless devices;
receiving user-specific signaling via a shared control channel or a dedicated control channel, wherein the traffic data and the user-specific signaling are for a multicast service; and
receiving reference bits on the shared data channel, the reference bits having a known value and a fixed offset transmit power level different than the traffic data and being used to estimate received signal quality of the shared data channel.

37. The method of claim 36, further comprising:
receiving power control information via a shared indicator channel or the dedicated control channel; and
adjusting transmit power of a transmission sent on a reverse link based on the power control information.

38. A method of receiving data at a wireless device in a wireless communication system, comprising:
receiving traffic data via a forward fundamental channel (F-FCH);
receiving user-specific signaling for the wireless device via a forward dedicated control channel (F-DCCH); and
receiving reference power control (PC) bits on the F-FCH, the reference PC bits having a known value and a fixed offset transmit power level different than the traffic data and being used for signal quality estimation of the F-FCH.

39. The method of claim 38, further comprising:
descrambling the traffic data with a long code generated using a common long code mask for the F-FCH.

40. The method of claim 38, further comprising:
descrambling the user-specific signaling for the wireless device with a long code generated using a unique long code mask for the wireless device.

41. The method of claim 38, further comprising:
receiving reverse link (RL) PC information for the wireless device via a forward common power control channel (F-CPCCH).

42. The method of claim 41, further comprising:
demultiplexing the RL PC information for the wireless device from the F-CPCCH based on a long code generated using a common long code mask.

43. The method of claim 41, wherein received signal quality of the F-DCCH is estimated based on the RL PC information for the wireless device received via the F-CPCCH.

44. The method of claim 38, further comprising:
estimating received signal quality of the F-FCH based on the reference PC bits received on the F-FCH;
generating forward link (FL) PC bits for the F-FCH based on the estimated received signal quality of the F-FCH; and
transmitting the FL PC bits for the F-FCH via a reverse pilot channel (R-PICH).

45. The method of claim 44, wherein the generating the FL PC bits for the F-FCH comprises:
comparing the estimated received signal quality of the F-FCH for each time interval against a setpoint for the F-FCH, and
generating an FL PC bit for the F-FCH for the time interval based on result of the comparison.

46. The method of claim 38, further comprising:
estimating received signal quality of the F-DCCH;
generating FL PC bits for the F-DCCH based on the estimated received signal quality of the F-DCCH; and
transmitting the FL PC bits for the F-DCCH via a reverse pilot channel (R-PICH).

47. The method of claim 46, wherein the generating the FL PC bits for the F-DCCH comprises:
comparing the estimated received signal quality of the F-DCCH for each time interval against a setpoint for the F-DCCH, and
generating an FL PC bit for the F-DCCH for the time interval based on result of the comparison.

48. The method of claim 46, wherein the generating the FL PC bits for the F-DCCH further comprises:
adjusting the setpoint for the F-DCCH based on the user-specific signaling received on the F-DCCH.

49. The method of claim 38, wherein the traffic data is received via the F-FCH from multiple sectors served by at least one base station and the user-specific signal is received via the F-DCCH from the multiple sectors.

50. The method of claim 38, further comprising:
transmitting a pilot and forward link (FL) PC information via a reverse pilot channel (R-PICH).

51. The method of claim 50, further comprising:
adjusting transmit power for the R-PICH based on reverse link (RL) PC information received for the wireless device.

52. The method of claim 38, further comprising: transmitting reverse link signaling via a reverse fundamental channel (R-FCH).

53. The method of claim 52, wherein the reverse fundamental channel (R-FCH) is inactive unless there is reverse link signaling to transmit.

54. An apparatus for a wireless device in a wireless communication system, comprising:

a receive data processor operative to perform processing for a forward fundamental channel (F-FCH) to receive traffic data sent on the F-FCH;
perform processing for a forward dedicated control channel (F-DCCH) to receive user-specific signaling sent on the F-DCCH to the wireless device, and
perform processing for the F-FCH to receive reference power control (PC) bits sent on the F-FCI-I, the reference PC bits having a known value and a fixed offset transmit power level different than the traffic data and being used for signal quality estimation of the F-FCH.

55. The apparatus of claim 54, wherein the data processor is further operative to perform descrambling for the traffic data with a long code generated using a common long code mask for the F-FCH.

56. The apparatus of claim 54, wherein the data processor is further operative to perform descrambling for the user-specific signaling for the wireless device with a long code generated using a unique long code mask for the wireless device.

57. The apparatus of claim 54, further comprising:
a controller operative to estimate received signal quality of the F-FCH based on the reference PC bits received on the F-FCH and to generate forward link (FL) PC bits for the F-FCH based on the estimated received signal quality of the F-FCH; and
a transmit data processor operative to process the FL PC bits for the F-FCH for transmission on a reverse pilot channel (R-PICH).

58. The apparatus of claim 54, further comprising:
a controller operative to estimate received signal quality of the F-DCCH and to generate FL PC bits for the F-DCCH based on the estimated received signal quality of the F-DCCH; and
a transmit data processor operative to process the FL PC bits for the F-DCCH for transmission on a reverse pilot channel (R-PICH).

59. An apparatus in a wireless communication system, comprising:
means for receiving traffic data via a forward fundamental channel (F-FCH);
means for receiving user-specific signaling for a wireless device via a forward dedicated control channel (F-DCCH); and
means for receiving reference power control (PC) bits on the F-FCH, the reference PC bits having a known value and a fixed offset transmit power level different than the traffic data and being used for signal quality estimation of the F-FCH.

60. The apparatus of claim 59, further comprising:
means for descrambling the traffic data with a long code generated using a common long code mask for the F-FCH.

61. The apparatus of claim 59, further comprising:
means for descrambling the user-specific signaling for the wireless device with a long code generated using a unique long code mask for the wireless device.

62. The apparatus of claim 59, further comprising:
means for estimating received signal quality of the F-PCH based on the reference PC bits received on the F-FCH;
means for generating forward link (FL) PC bits for the F-FCH based on the estimated received signal quality of the FFCH; and
means for transmitting the FL PC bits for the F-FCH via a reverse pilot channel (R-PICH).

63. The apparatus of claim 59, further comprising:
means for estimating received signal quality of the F-DCCH;
means for generating FL PC bits for the F-DCCH based on the estimated received signal quality of the F-DCCH; and
means for transmitting the FL PC bits for the F-DCCH via a reverse pilot channel (R-PICH).

64. A computer-readable storage medium having executable instructions encoded thereon which, when executed, perform a method of transmitting data to a plurality of wireless devices in a wireless communication system, the method comprising:
transmitting traffic data to the plurality of wireless devices via a shared data channel;
transmitting user-specific signaling to each of the plurality of wireless devices via a shared control channel used for the plurality of wireless devices or a dedicated control channel used for the wireless device, wherein the traffic data and the user-specific signaling are for a multicast service; and
transmitting reference bits on the shared data channel, the reference bits having a known value and a fixed offset transmit power level different than the traffic data and being used for signal quality estimation of the shared data channel.

65. A computer-readable storage medium having executable instructions encoded thereon which, when executed, perform a method of receiving data in a wireless communication system, the method comprising:
receiving traffic data via a shared data channel sent to a plurality of wireless devices;
receiving user-specific signaling via a shared control channel or a dedicated control channel, wherein the traffic data and the user-specific signaling are for a multicast service; and
receiving reference bits on the shared data channel, the reference bits having a known value and a fixed offset transmit power level different than the traffic data and being used to estimate received signal quality of the shared data channel.

* * * * *